United States Patent
Kelly et al.

(10) Patent No.: US 12,167,365 B1
(45) Date of Patent: Dec. 10, 2024

(54) MULTI-MODAL ROUND TRIP TIME MITIGATION FOR WIRELESS LOCAL AREA NETWORK DEVICES

(71) Applicant: SR Technologies, Inc., Sunrise, FL (US)

(72) Inventors: Kyle Patrick Kelly, Palm Beach Gardens, FL (US); Mark Passler, Boca Raton, FL (US); Graham K. Smith, Boca Raton, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 18/672,299

(22) Filed: May 23, 2024

Related U.S. Application Data

(60) Provisional application No. 63/508,404, filed on Jun. 15, 2023.

(51) Int. Cl.
*H04W 64/00* (2009.01)
*H04W 84/12* (2009.01)

(52) U.S. Cl.
CPC ......... *H04W 64/006* (2013.01); *H04W 84/12* (2013.01)

(58) Field of Classification Search
CPC ..... H04W 4/38; H04W 64/00; H04W 74/006; H04W 56/001; H04W 64/003; H04W 56/0065; H04W 4/33; H04W 92/18; H04W 72/542; H04W 56/00; H04W 36/32; H04L 5/0055; H04L 45/24; H04L 1/1678
See application file for complete search history.

(56) References Cited

U.S. PATENT DOCUMENTS

| | | | |
|---|---|---|---|
| 2014/0269400 A1* | 9/2014 | Aldana | H04W 64/00 370/253 |
| 2019/0349280 A1* | 11/2019 | Zhang | H04W 84/12 |

* cited by examiner

*Primary Examiner* — Kwasi Karikari
(74) *Attorney, Agent, or Firm* — Goodwin Procter LLP

(57) ABSTRACT

A method in a first wireless device (WD) is described. The method includes determining one round trip time (RTT) of a first set of RTTs. The method also includes, at set intervals (TK), determining a set of mode peaks of the first set of RTTs, determining that the first SIFS mode has the highest mode peak of the set of mode peaks, determining that the second SIFS mode has the second highest peak of the set of mode peaks, determining a mode difference (TD), and adjusting the second subset of RTTs at least by adding or subtracting TD to each RTT of the second subset of RTTs. The method also includes determining a second set of RTTs comprising the first subset of RTTs and the adjusted second subset of RTTs, the second set of RTTs corresponding to the adjusted single SIFS mode.

20 Claims, 22 Drawing Sheets

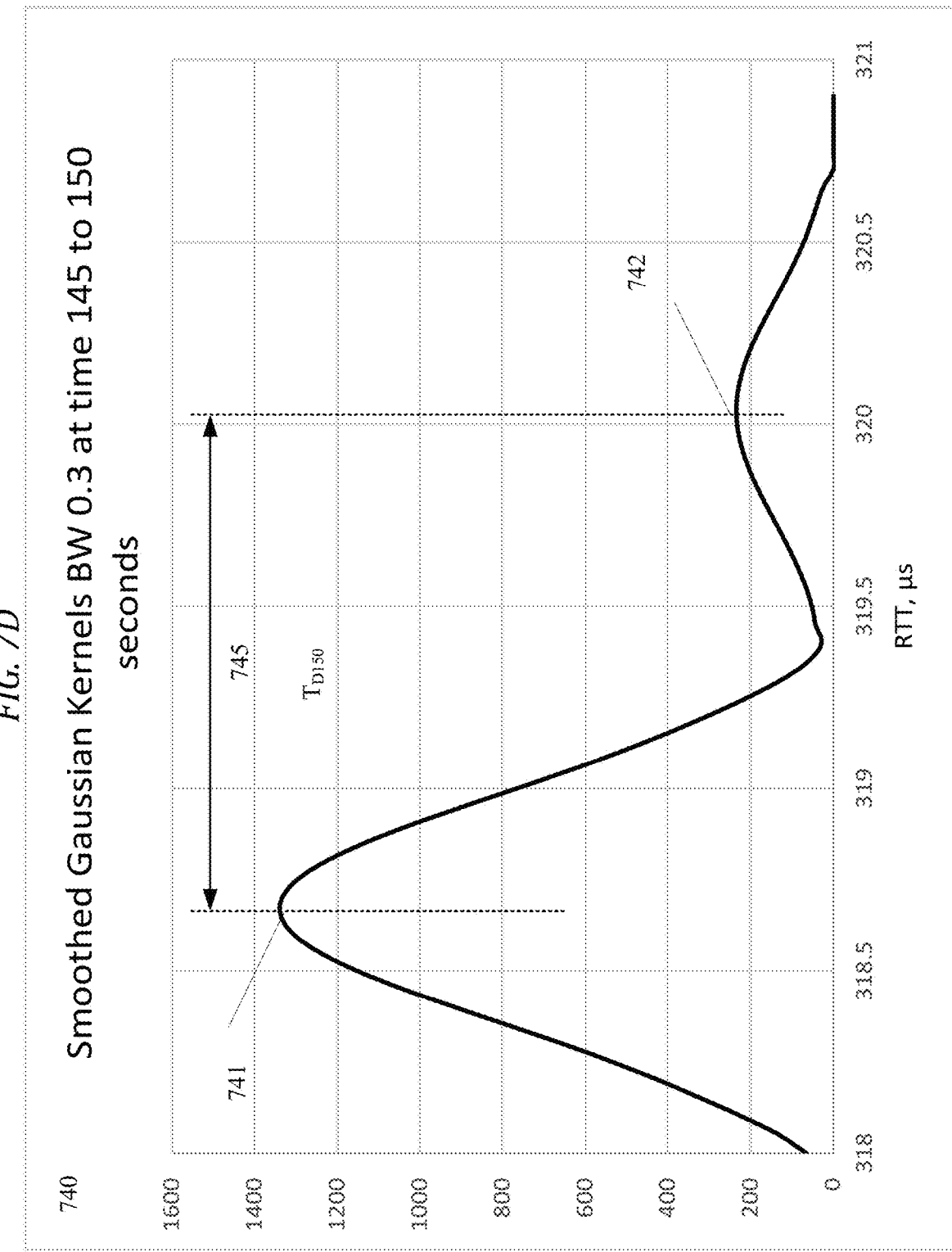

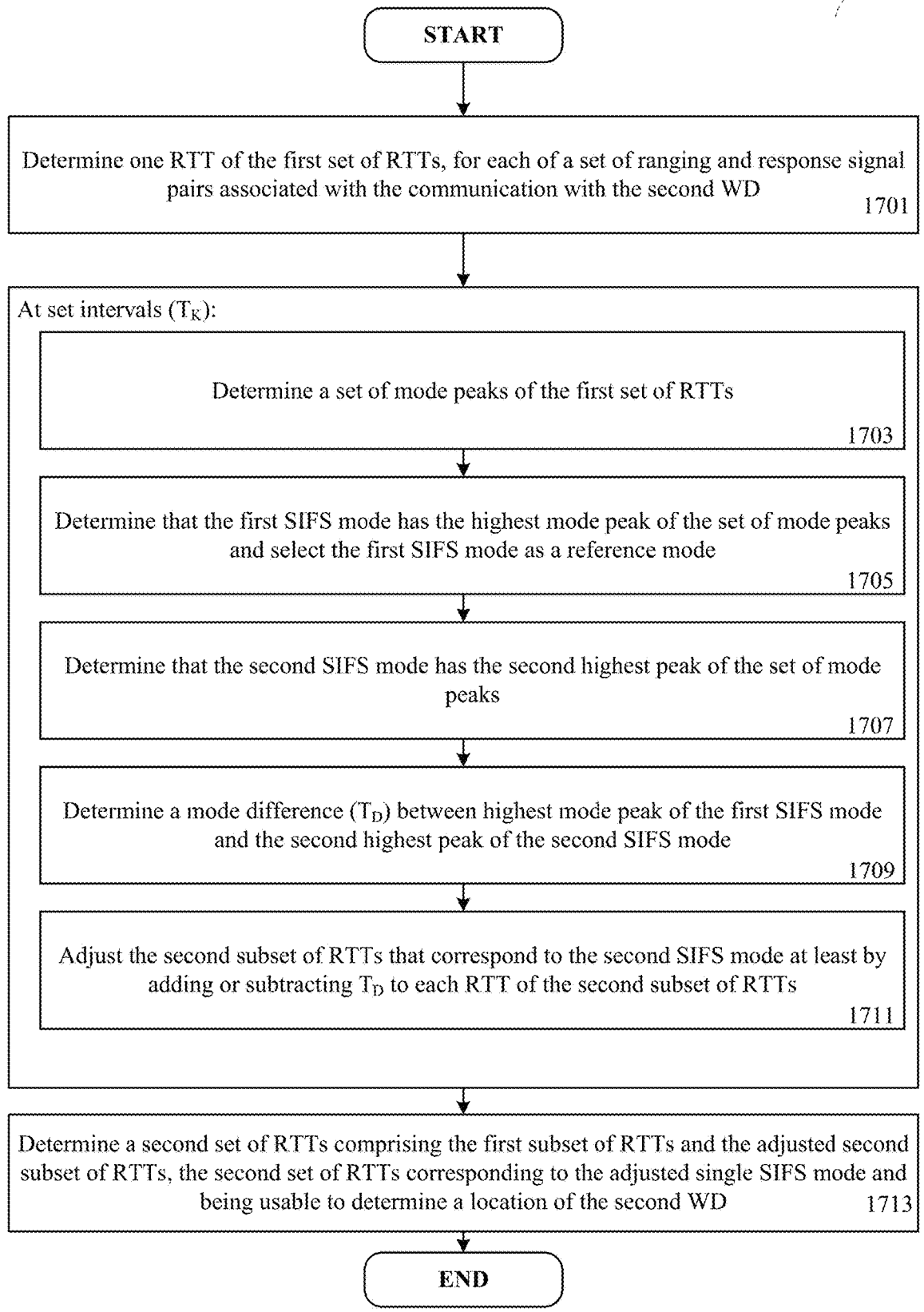

MULTI-MODAL ROUND TRIP TIME MITIGATION FOR WIRELESS LOCAL AREA NETWORK DEVICES

CROSS-REFERENCE TO RELATED APPLICATION

This application is related to and claims priority to U.S. Provisional Patent Application Ser. No. 63/508,404, filed Jun. 15, 2023, entitled MULTI-MODAL ROUND TRIP TIME MITIGATION FOR WIRELESS LOCAL AREA NETWORK DEVICES, the entirety of which is incorporated herein by reference.

TECHNICAL FIELD

The present disclosure relates to geo-location of wireless devices, and in particular to a method, device, and system for the geo-location of wireless local area network (WLAN) devices.

BACKGROUND

Initially, it is noted that Institute of Electrical and Electronics Engineers (IEEE) Standard 802.11-2020 is used as the base reference for disclosures made herein, the entire contents of which are incorporated herein by reference. The IEEE 802.11-2020 Standard is commonly referred to as "Wi-Fi" and is referred to as such herein.

The location of wireless devices can be determined by various methods. These methods may be classified as active, passive and combined active and passive. In an active location scheme, a device that is determining the location or range, the measuring device, transmits certain packets to the device being located, i.e., the target device, and a common method is to measure the time of arrival (TOA) of the response packet from the target device and compare that to the time of departure (TOD) of the request packet that was transmitted by the measuring device so as to determine the round trip time (RTT).

In such location systems, it is common to use multiple measuring devices to determine the location. In such a scheme, simultaneous TOA and/or TOD measurements are taken by different measuring devices situated at different points, and the location of the target device is calculated from these simultaneous measurements.

In an active location scheme, the TOD may be measured for a packet that is transmitted from the measuring station addressed to the target station. The TOA of the response from the target station at the measuring station is then also measured. If the turnaround time for the target station to receive the packet from the measuring station and to start to transmit the response is known, or is known to be a constant, then the time difference at the measuring station between the TOA and the TOD, minus the turnaround time at the target station will be directly proportional to twice the distance of the target station from the measuring station. For example, if the target station is a wireless device based upon IEEE 802.11 technology, and if the packet transmitted from the measuring station to the target station is a data packet, the response from the target station will normally be an acknowledgement (ACK) packet. If the packet transmitted from the measuring station to the target station is a control packet, for example a request-to-send (RTS) packet, then the response from the target station will normally be a clear-to-send (CTS) packet. In these two examples, the turnaround time at the target station is defined in the IEEE 802.11 standard as the short interframe spacing (SIFS), which is a preset value. Hence, the propagation time delay, td, between the measuring station and the target station, may be determined from the calculation: $td=(TOA-TOD-SIFS)/2$, and the distance between the measuring station and the target station is then $td*c$, where c is the speed of light. This method of estimating the distance to a target station by measuring the TOD and TOA and accounting for the turnaround time is known.

FIG. 1 is a diagram of a typical location system 100 which includes three wireless measuring stations 110a, 110b and 110c (referred to collectively herein as "wireless measuring stations" or "wireless measuring receivers" 110). The target station 120 may be a wireless device, such as, for example, an Access Point (AP) that is to be located by the three mobile wireless measuring stations 110. The distance of the target station 120 from wireless measuring station 110a is D1, 130. The distance of the target station 120 from wireless measuring station 110b is D2, 140. The distance of the target station 120 from wireless measuring station 110c is D3, 150. The time of flight, TOF, determined from the calculation $TOF=(TOA-TOD-SIFS)=RTT-SIFS$, is measured for transmissions from wireless measuring station 110a and this can used to calculate the distance D1 130 using the formula $D1=TOF1*c/2$ where c is the speed of light. Similarly, TOF2 and TOF3 measurements result in the determination of distances D2 140 and D3 150. The methods for calculating the location of target station 120 using the distances D1 130, D2 140 and D3 150 are well known.

It has been observed that a number of Wi-Fi Access Points do not use the SIFS value defined in the Standard, and furthermore may use more than one SIFS value. In the general sense, it has been observed that many Access Points use two SIFS values and randomly switch between them. In a less general sense, some Access Points use more than two SIFS values. If the SIFS value is changing, then the measured RTT will vary with the change in SIFS value, resulting in an inaccurate calculation of the distance. This varying RTT value must be mitigated in order to accurately calculate the location using RTT measurements.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIGS. 7A, 7B, 7C and 7D are a set of smoothed histograms, KDEs using a Gaussian kernel with standard deviation σ of 0.3, corresponding to the set of histograms in FIGS. 6A, 6B, 6C and 6D;

FIG. 17 is an example process according to some embodiments of the present disclosure.

DETAILED DESCRIPTION

In one embodiment of the present disclosure, a single, mobile wireless measuring station 110 is used. Wireless measuring station 110 may be ground based or airborne. The present disclosure provides methods and devices that detect the presence of a target station 120 that has multiple SIFS values, i.e. SIFS modes, causing multi modal RTT value. The modes are identified and the multi modal RTT values adjusted so as to become a single set corresponding to a single mode.

Figure 1:
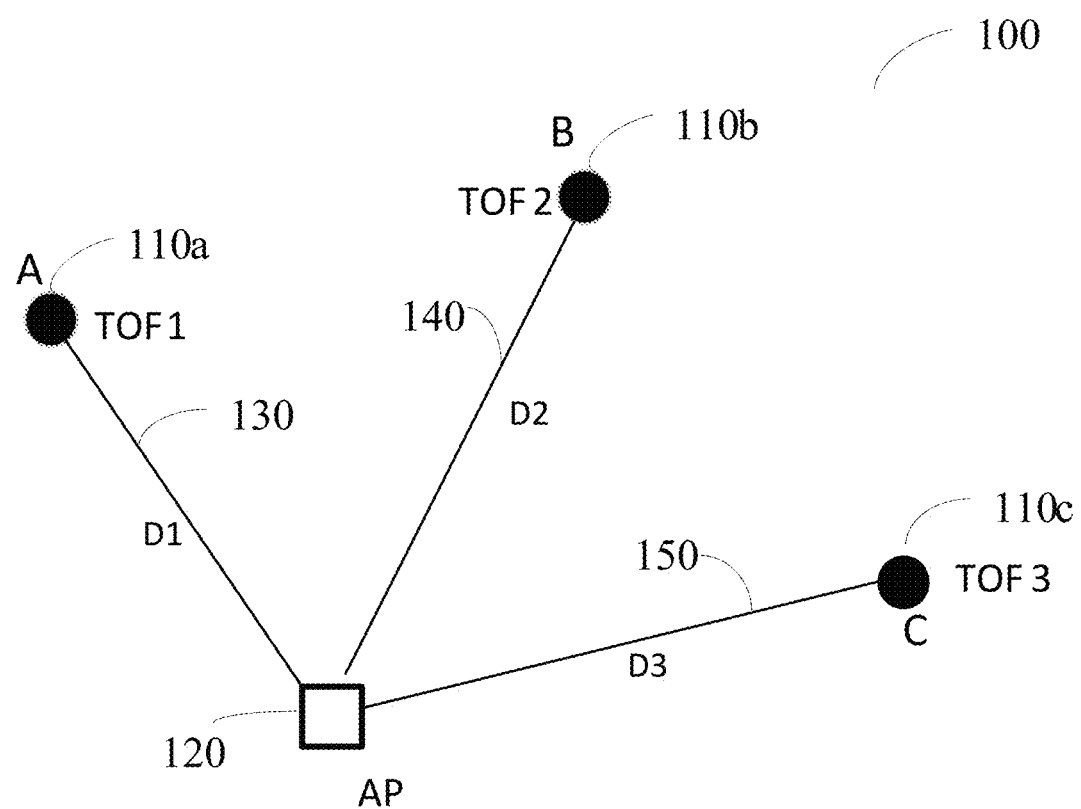
FIG. 1 is a diagram of a typical location system which includes three wireless measuring stations.
Figure 2:
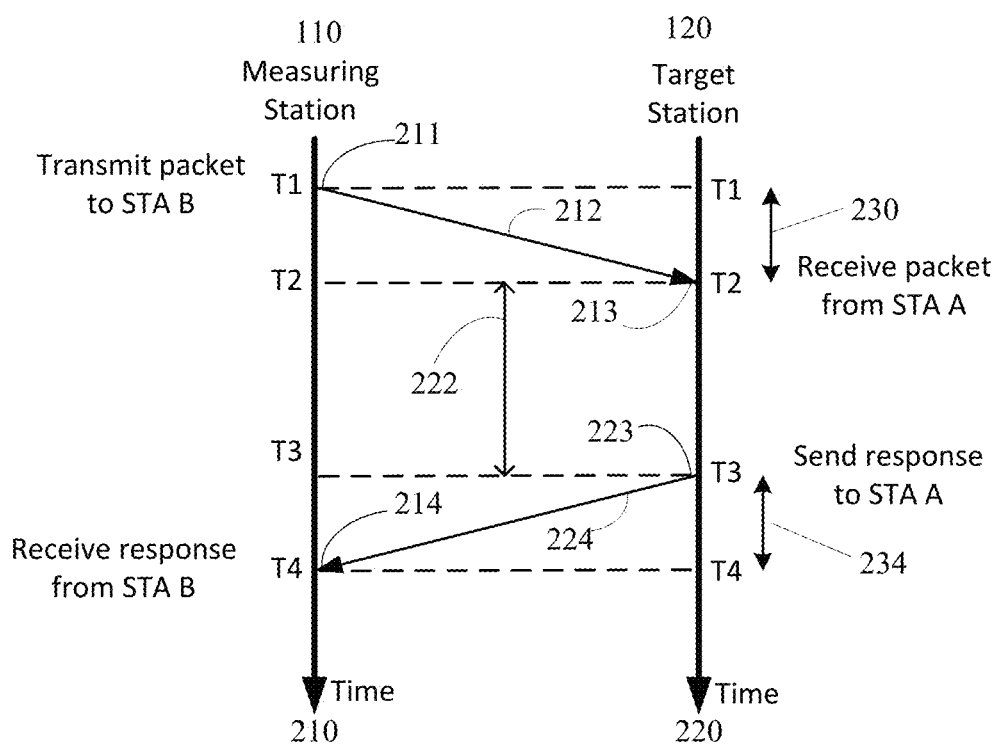
FIG. 2 is a timing diagram that describes a ranging method of the present disclosure that may be used to determine the distance between two wireless devices, such as wireless measuring station and wireless target station.

Referring again to the drawing figures in which like reference designators refer to like elements, there is shown in FIG. 2 a timing diagram that describes a ranging method of the present disclosure that may be used to determine the distance between two wireless devices, such as wireless measuring station 110 and wireless target station 120. Time axis 210 refers to the time axis for wireless measuring station 110 and time axis 220 refers to the time axis for wireless target station 120. At time T1 211, wireless measuring station 110 transmits a packet to wireless target station 120. This ranging packet 212 transmission is received at wireless target station 120 at time T2 213. The propagation time of the ranging packet 212 transmission is (T2−T1) 230. Wireless target station 120 transmits a response packet 224 at time T3 223. The time 222 that has elapsed between the reception of the packet at time T2 213 and the transmission at time T3 223 is the turnaround time at wireless target station 120. Ideally, the turnaround time 222 at STA B will be equal in duration to SIFS. At time T4 214, wireless measuring station 110 receives the response packet 224 from wireless target station 120. The propagation time of the transmission of the response packet 224 is (T4−T3) 234. It should be noted that the time differences 230 (T2−T1) and 234 (T4−T3) represent the propagation time, td, of the transmissions and should be equal assuming the distance between the two stations has not changed. The total time, RTT, that elapses between the transmission of ranging packet 212 and the response packet 224 at wireless measuring station 110 is:

$$RTT=(T2-T1)+(T3-T2)+(T4-T3)=(T4-T1)=td+SIFS+td \quad (1)$$

Hence, $RTT=(T4-T1-SIFS)$ $$RTT=2td+SIFS \quad (2)$$

Equation (2) is a simplified equation that is included so as to provide an understanding of the basic concept of the ranging transmission method. The duration of the transmitted packet and the response packet are not accounted for in equation (2). Further, in practice, it is common that the timestamp of a packet is set to coincide with the end of the packet at the point where the frame check is completed.

Figure 3:
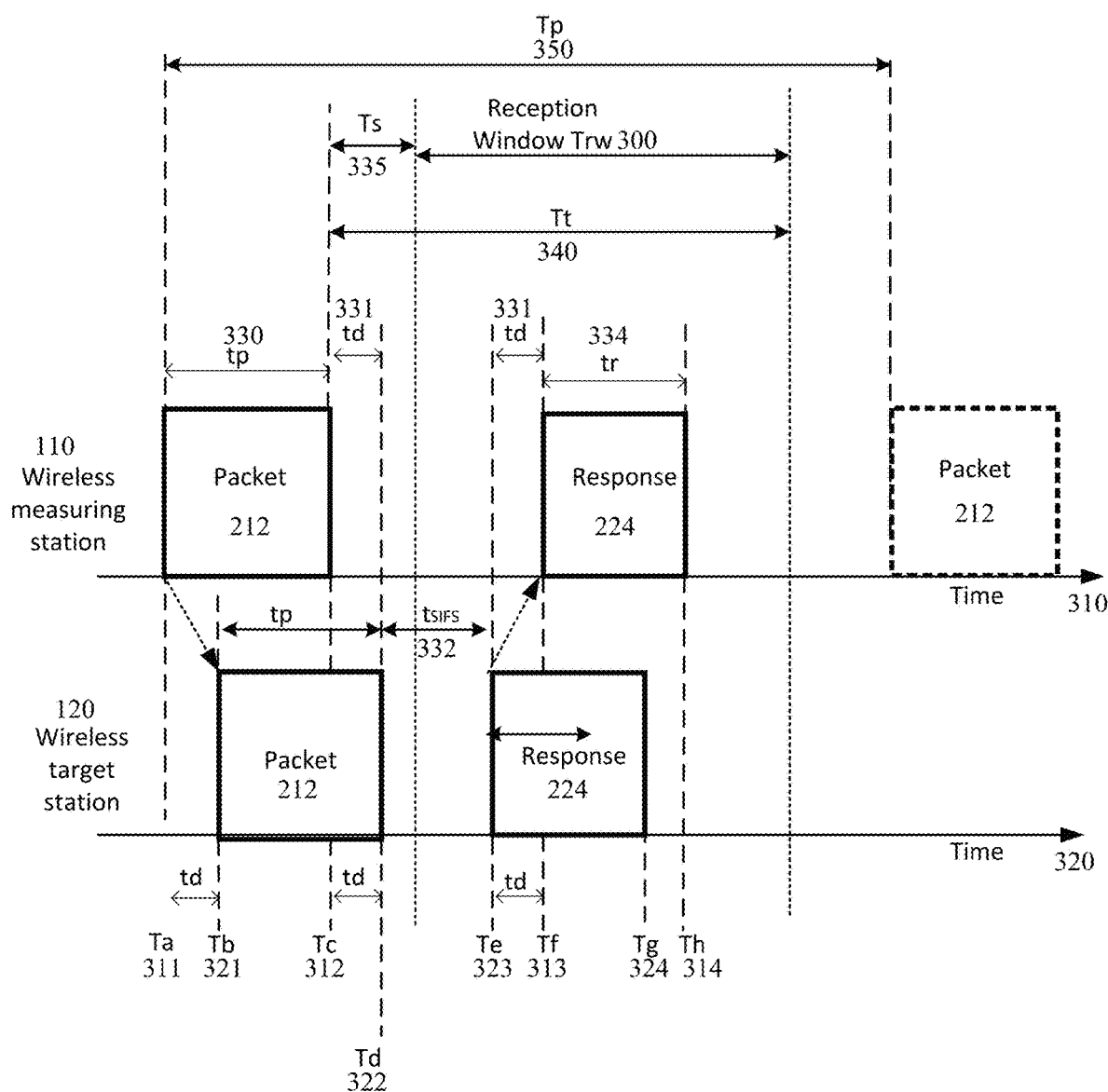
FIG. 3 is a timing diagram that describes in further detail the ranging transmission method.

FIG. 3 is an example timing diagram that describes in further detail the ranging transmission method. Time axis 310 is the time axis for wireless measuring station 110 and time axis 320 is the time axis for wireless target station 120. At time Ta 311, wireless measuring station 110 starts the transmission of ranging packet 212 which is addressed to wireless target station 120. After a time-delay of td, at time Tb 321, wireless target station 120 starts to receive ranging packet 212. At time Tc 312, wireless measuring station 110 completes the transmission of ranging packet 212 and at time Td 322, wireless target station 120 completes the reception of ranging packet 212. The time difference between Tc 312 and Td 322 is td, the propagation time for the packet to travel from wireless measuring station 110 to wireless target station 120. The time differences (Tc−Ta) and (Td−Tb) are both the duration tp 330 of the transmitted ranging packet 212.

Wireless target station 120 transmits the response packet 224 at time Te 323. Assuming that the response packet 224 is an ACK or an RTS packet in reply to the received ranging packet 212, time Te 323 ideally will be at a time tsrs 332 after time Td 322, where tsrs 332 is the SIFS time as defined in the IEEE 802.11 standard. At time Tf 313, wireless measuring station 110 starts to receive the response packet 224. At time Tg 324, wireless target station 120 completes the transmission of the response packet 224 and at time Th 314, wireless measuring station 110 completes receiving the response packet 224. The time differences (Tb−Ta), (Td−Tc), (Tf−Te) and (Th−Tg) are all equal and have the value td which is the propagation time for the packet and response to travel between the two wireless stations.

At wireless measuring station 110, the time of a packet at the point when the frame check has completed, may be recorded. Hence, the time for the transmission of ranging packet 212 that is recorded is Tc 312, and the time that is recorded for the reception of the response packet 224 is Th 314. In order to calculate the value of td, it is desirable to know the duration tr 334 of the response packet 224. Calculating the duration tr 334 is straightforward as the wireless measuring station 110 can monitor the details of the response packet such as data rate and length. In practice therefore, wireless measuring station 110 can measure the RTT from equation (3)

$$RTT=Th-Tc-tr \quad (3)$$

And can calculate the value of td from expression (4):

$$td=(RTT-tr-t_{SIFS})/2 \quad (4)$$

and hence the corresponding distance, $D=td*c$ \quad (5)

Ranging packets 212 may be transmitted separated by time Tp 350, either continuously or in bursts.

A reception window Trw 300 may be defined which may be related to the range of the target, wireless target station 120. The reception window starts at time Ts 335 after the end of the transmission, Tc 312 of ranging packet 212 and ends at time Tt 340 after the end of the transmission, Tc 312 of ranging packet 212. As an example, consider the case where the wireless target station 120 is known to be at a range of, for example, 0 to 2 miles from wireless measuring station 110 as may be appropriate for a ground based mobile wireless measuring station 110. In this example, assuming 1 Megabits per second (Mbps) direct-sequence spread spectrum (DSSS) packets, the reception window Trw may be set to start at time Ts 330, 10 μs after time Tc 312, and end at time Tt 340, 335 μs after time Tc 312. In this example, the duration of the reception window Trw 300 is 325 μs.

Figure 4:
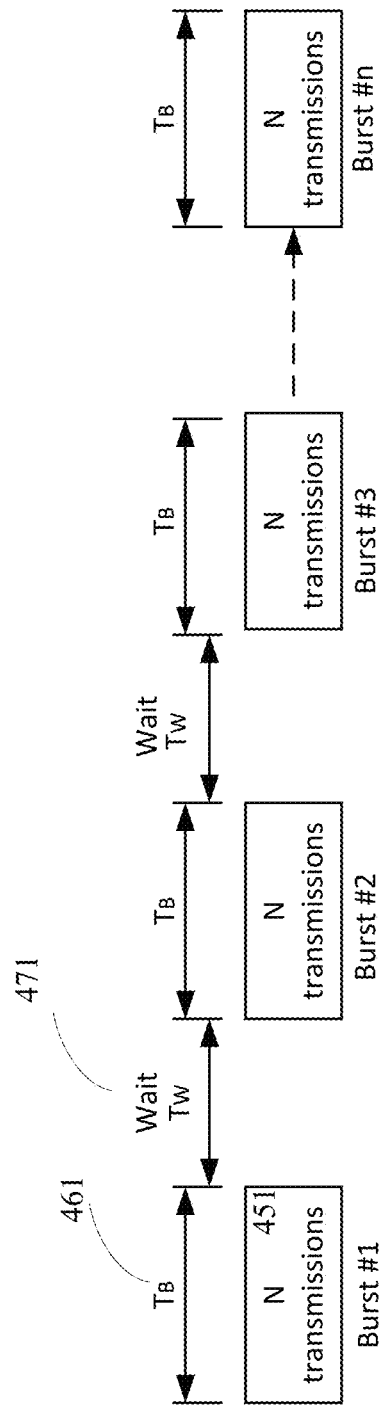
FIG. 4 is a timing diagram of a series of bursts of transmissions of the ranging packets.

FIG. 4 is an example timing diagram of a series of bursts of transmissions of the ranging packets 212. In one embodiment of this disclosure, a "burst", 451, including a preset number N of transmissions of packets 212 from wireless measuring station 110, may be sent followed by a "wait" period, Tw 471. This sequence may continue until a command may be issued to terminate the transmissions. Within each burst, each of the N transmissions may be separated by a preset time, Tp 350 (as shown on FIG. 3). The duration TB 461 of each burst will therefore be N Tp. For example, a burst may include 128 transmissions of packets 212 from wireless measuring station 110, each transmission, say, 1 ms apart (i.e., Tp 350=1 ms), followed by a wait period, Tw 471, of, say, 30 ms after which another burst of 128 transmissions may be sent. In this example the duration of each burst will be 128 ms.

In the case that there is a single wireless measuring station 110, as may be the case when the station is airborne, then the three measuring distances D1 130, D2 140 and D3 150 will be taken at different points in time. In this case, the airborne wireless measuring station 110 may be flying over an area and periodically transmitting ranging packets 212, receiving the response packets 224, determining the RTTs and calculating the corresponding delay times td. Over time, the location of wireless target station 120 can be calculated with increasing accuracy as more measurements are taken by the airborne wireless measuring station 110 from varying positions. Such calculations are well known.

As mentioned previously, the packet exchange may be any pair of packets where an automatic response packet is sent. Commonly used packets in Wi-Fi include an RTS/CTS exchange and a Data (null)/Ack exchange.

From equations (3) and (4), $$RTT = 2td + tr + t_{SIFS} \quad (5)$$

Where td is the propagation time 331; and
tr is the duration 334 of the response packet.

If the value of $t_{SIFS}$ 332 is changing, then the measured values of RTT will vary, even when the target station 120 is at the same distance from the wireless measuring station 110. In order to calculate the propagation delay td 331, it is necessary to determine the value of $t_{SIFS}$ 332 at each exchange of ranging packet 212 and response packet 224.

A more complete understanding of the present disclosure, and the attendant advantages and features thereof, will be more readily understood by reference to the following example of RTTs measured by a mobile wireless measuring station 110 from an Access Point, acting as target station 120, with varying SIFS values.

FIG. 5 is an example scatter plot graphical representation of RTTs measured by a mobile wireless measuring station 110 from exchanges of packets 212 and 224 as described above with reference to FIGS. 3, 4 and 5, over a period of 175 seconds. The two distinct groups of RTTs 501 and 502 are the result of the wireless target station 120 varying its value of SIFS. The RTT values are naturally scattered due to propagation variations. In the general sense, a curve fit would be made to best fit the plot of the RTTs. With the RTT variation as shown in scatter plot 500, an accurate curve fit may be impossible.

Figure 5:
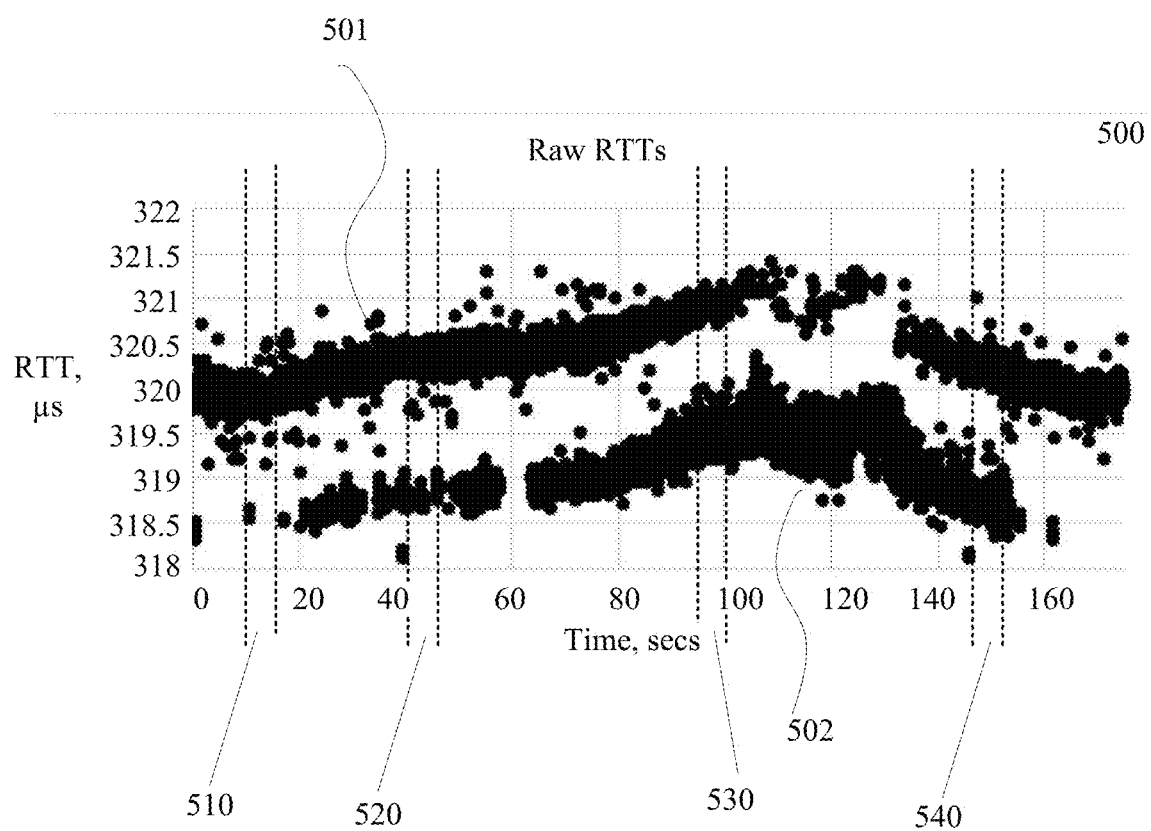
FIG. 5 is a scatter plot graphical representation of RTTs measured by a mobile measuring station from exchanges of packets as described above with reference to FIGS. 3, 4 and 5 over a period of 175 seconds.
Figure 6A:
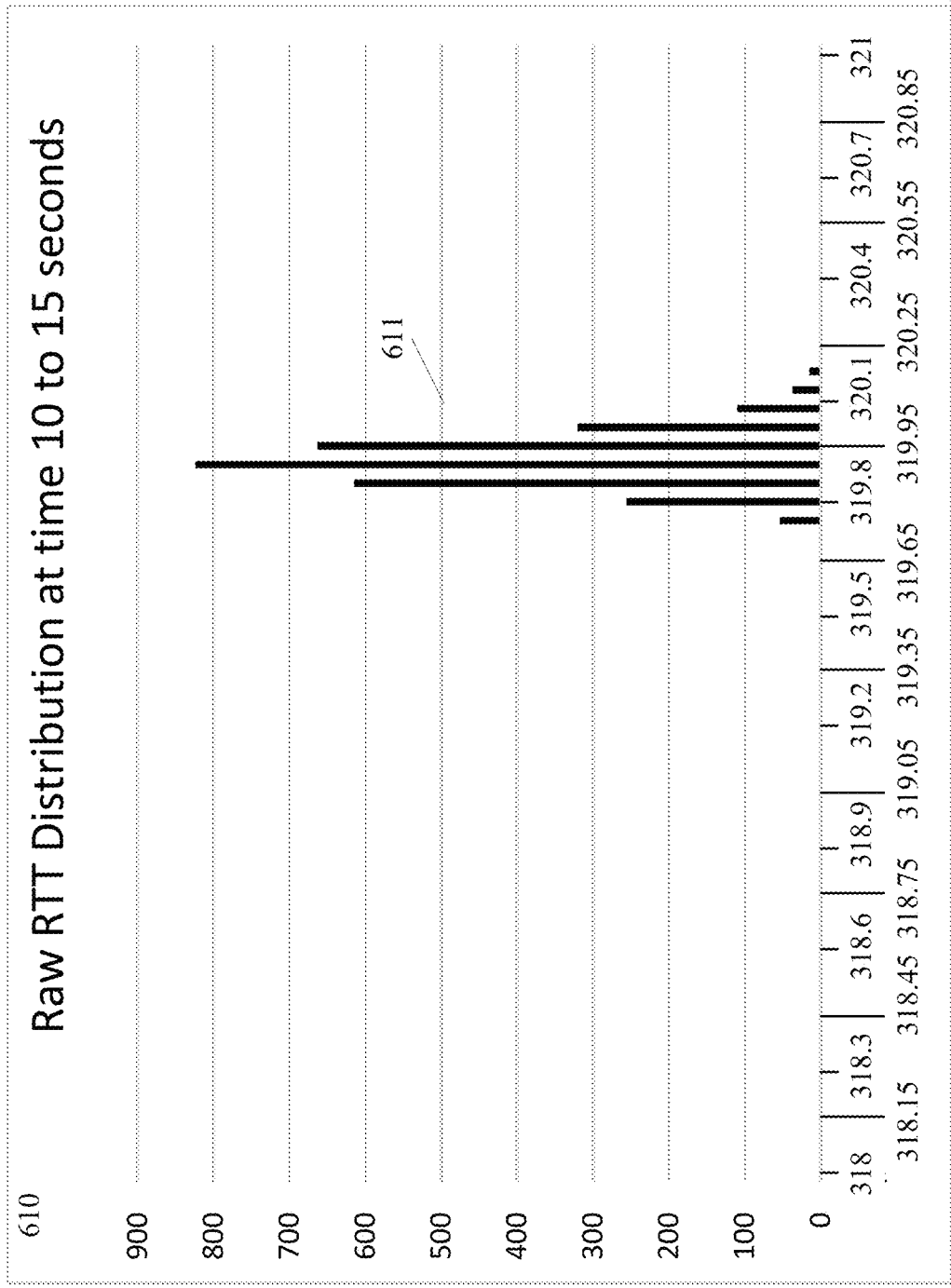
FIGS. 6A, 6B, 6C and 6D are a set of RTT histograms corresponding to 5 second periods with 0.05 us bins for the RTTs depicted in FIG. 5.
Figure 6B:
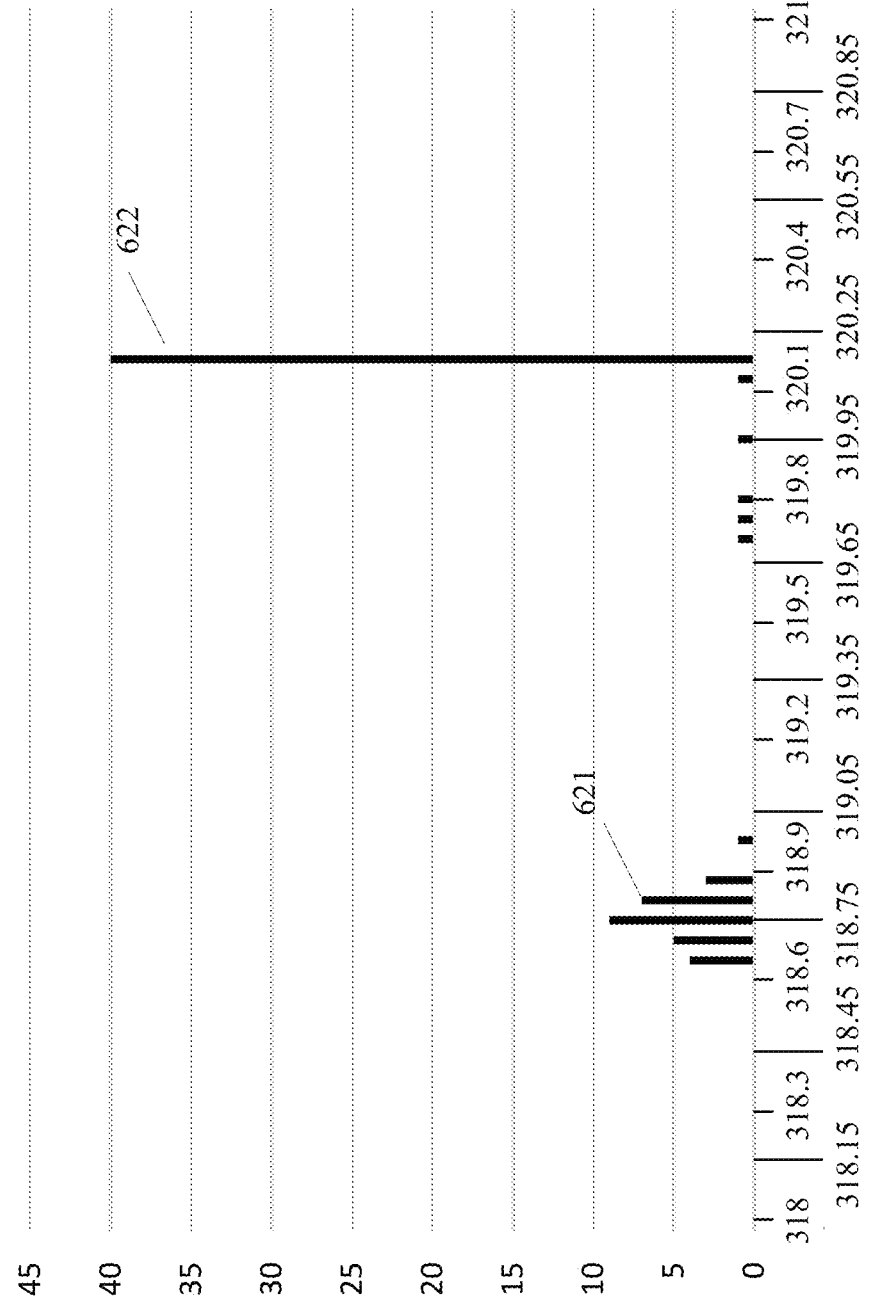
Figure 6C:
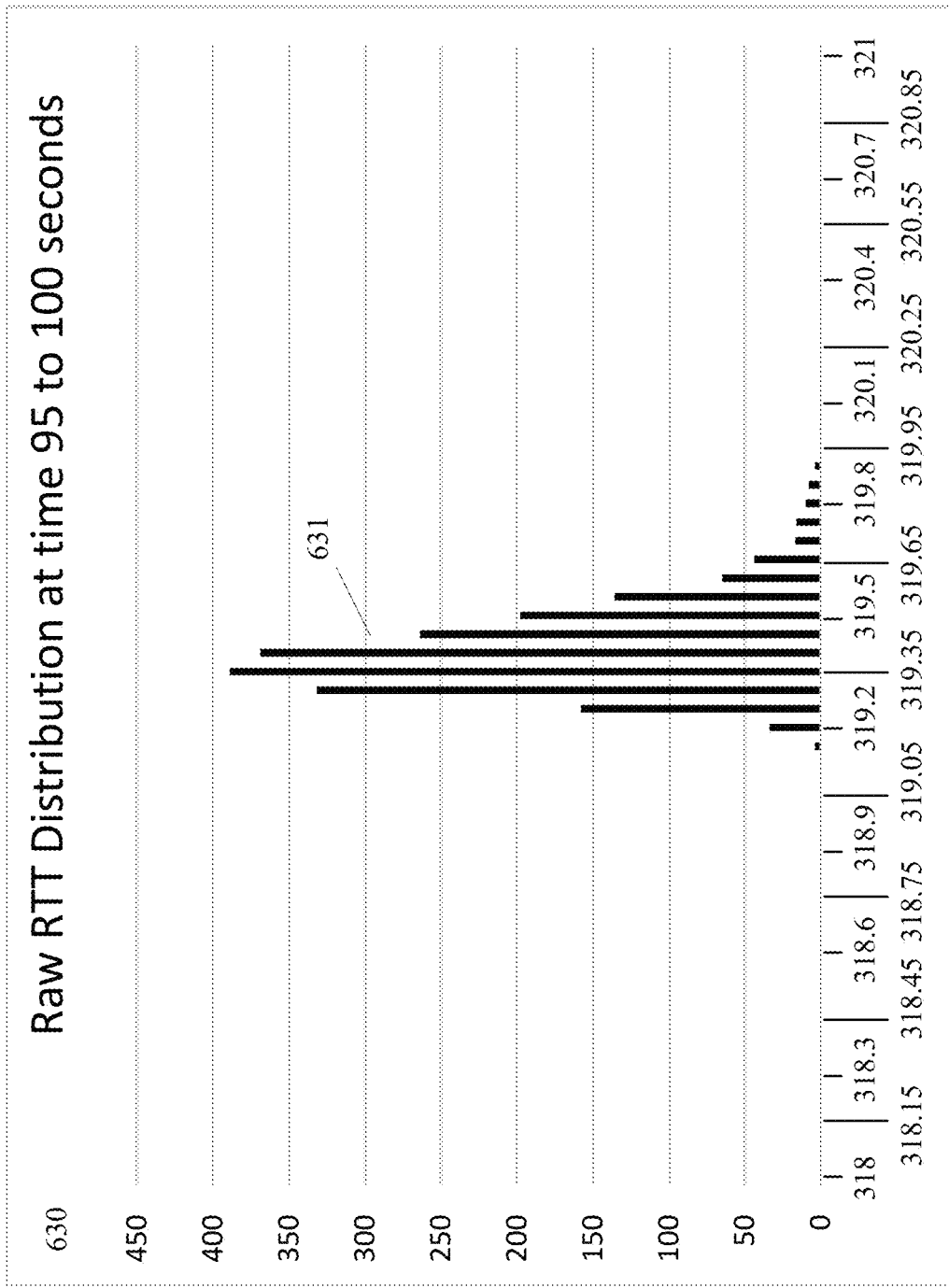
Figure 6D:
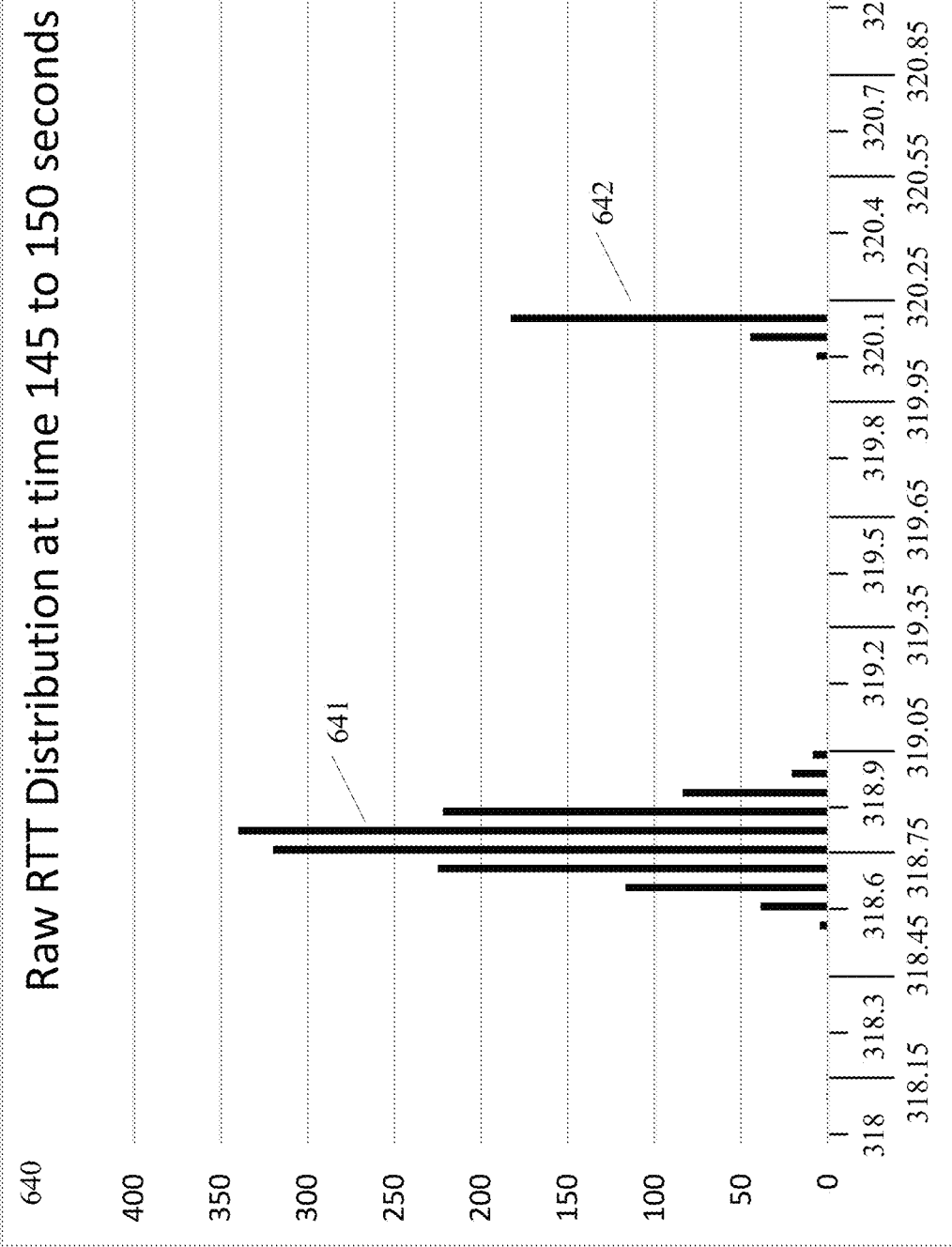

FIGS. 6A, 6B, 6C, and 6D are a set of RTT histograms corresponding to selected 5 second periods with 0.05 us bins. The RTT histogram is a chart that plots the distribution of RTTs where each bar covers a range of numeric values called a bin: a bar's height indicates the frequency of RTTs with a value within the corresponding bin. The 5 second periods are depicted in FIG. 5. FIG. 6A, histogram 610 corresponds to the RTTs measured in the period 10 to 15 seconds, 510. FIG. 6B histogram 610 corresponds to the RTTs measured in the period 40 to 45 seconds, 520. FIG. 6C histogram 630 corresponds to the RTTs measured in the period 95 to 100 seconds, 530. FIG. 6D histogram 640 corresponds to the RTTs measured in the period 145 to 150 seconds, 540.

Histogram 610, 10 to 15 seconds, indicates that the RTTs 611 generally correspond to a single SIFS value. Histogram 620, 40 to 45 seconds, shows that the RTTs are in two groups 621 and 622 indicatives of more than one SIFS value. Histogram 630, 95 to 100 seconds, shows that the RTTs 631 again generally correspond to single SIFS value but that this SIFS value is aligned with the RTT group 621 not with the SIFS value used for groups 611 and 622. Histogram 640, 145 to 150 seconds, shows two groups of RTT distributions 641 and 642 again indicative of more than one SIFS value.

The histograms as depicted in FIGS. 6A, 6B, 6C, and 6D are discrete and may be affected by SIFS jitter as well as propagation variations. In order to mitigate these variations, the next step in the disclosed method is to estimate the underlying probability density functions, PDF, and to effectively smooth the results in order to find accurate maximum values of RTTs. Different approaches may be used to produce the PDF and/or smooth the histograms. One method is to apply a window function to the set of RTTs. The window function may be weighted or simply sum a number of adjacent values for every value in the histogram. Another more accurate method is to estimate the non-parametric probability using a kernel density estimation, KDE. The distribution of RTT data points can be mathematically calculated by an unknown, underlying probability density function that can be estimated via Kernel Density Estimation, KDE. The superposition of kernel functions, weighing each data point, generates the KDE surface, which contains local maxima or peaks, where the highest frequency value RTTs or modes reside. A technique referred to as "non-parametric mean shift clustering algorithm" calculates the weighted mean within the bandwidth or distance of the window of each RTT data point, then shifts the data point to the newly updated weighted mean (mean-shift vector), and iteratively performs this process until each RTT data point has converged to local or global maximum RTT values, known as the "modes". This iterative process ceases when the mean-shift vector is smaller than a specified tolerance, and the data point is said to have converged. When all RTT data points have converged, the data has been optimized.

KDEs are closely related to histograms but by using a suitable kernel can produce a smooth PDF suitable for analysis of the RTT results. A range of kernel functions may be used, but a common kernel is the standard normal function, Gaussian. The bandwidth of each data point being evaluated encompasses other data points in its neighborhood, each weighted by their own kernel functions. The bandwidth centered upon the data point being evaluated defines the region of a newly weighted mean being calculated, which may be utilized to shift the data point towards the direction of highest density. This procedure is executed for every data point. The quantity of modes in a density distribution is dependent on the bandwidth of the kernel function implemented. For large bandwidths, the density distribution includes a single or few modes, while smaller bandwidths can seek out more modes. For example, a bandwidth, i.e., a standard deviation, $\sigma$, of 0.3 us for the Gaussian distribution KDE is suitable to cater for the expected jitter in the RTTs from a Wi-Fi AP. In the following descriptions, although the general term "KDE" is used together with modes and peaks, it should be understood that these terms may encompass techniques such as non-parametric mean shift clustering.

Figure 7A:
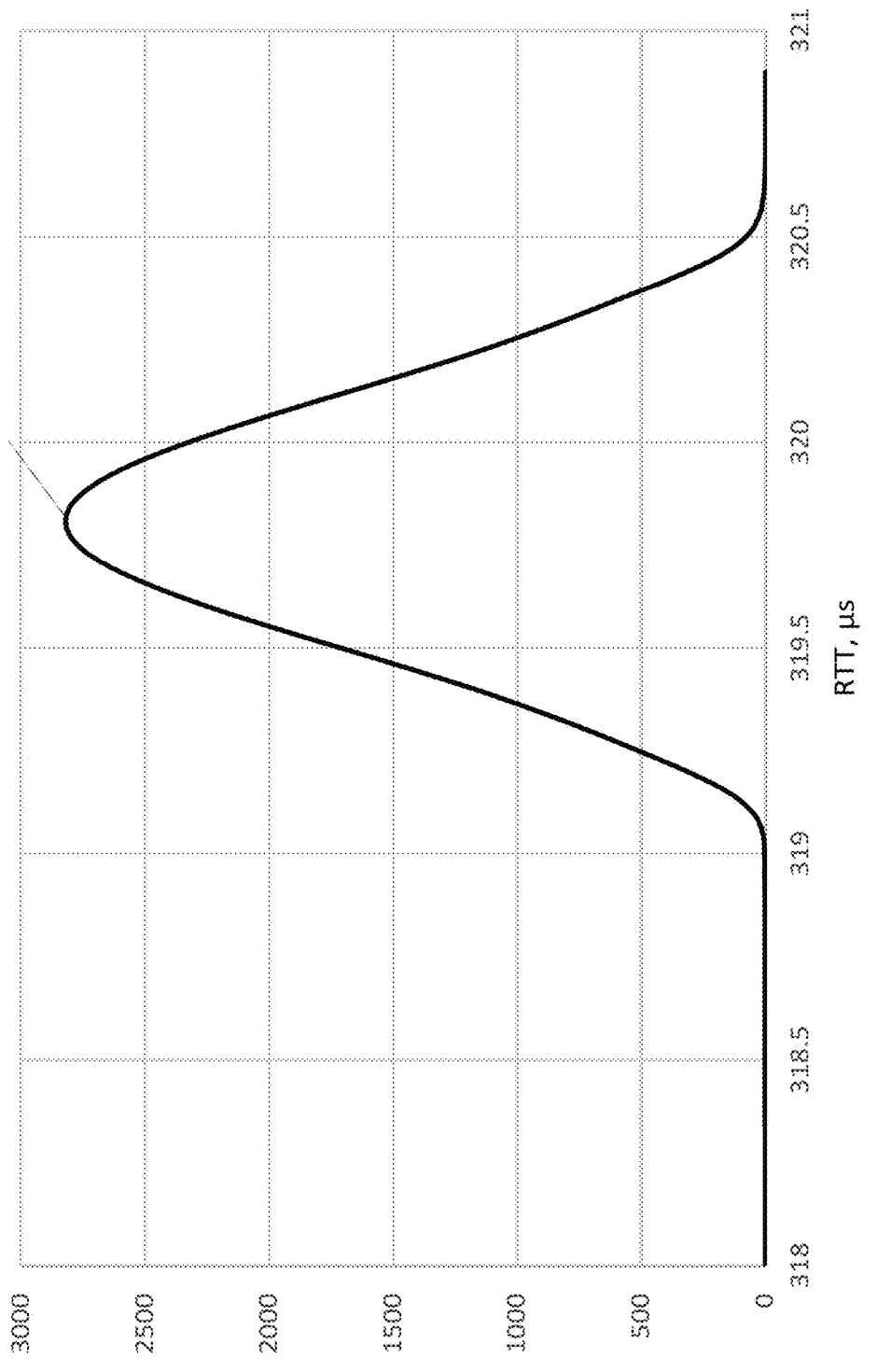
Figure 7B:
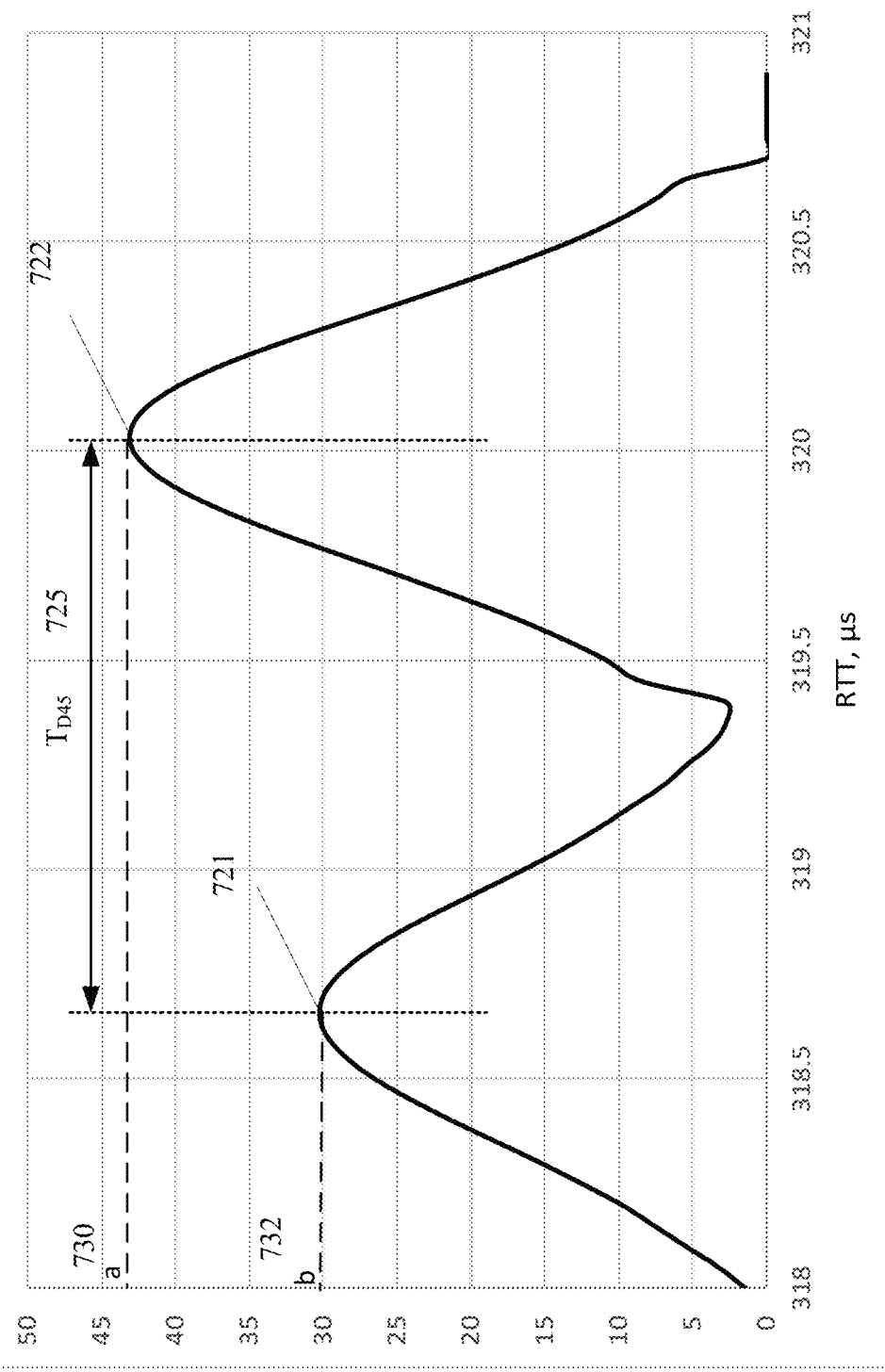

FIGS. 7A, 7B, 7C and 7D are an example of a set of smoothed histograms, KDEs using a Gaussian kernel with standard deviation $\sigma$ of 0.3, corresponding to the set of histograms in FIGS. 6A, 6B, 6C, and 6D, respectively. The effect of KDE is to produce a PDF estimation that clearly demonstrates the mode(s) and peak(s). The term "smoothed histogram" is used to cover the general concept that the histograms may be smoothed by various means, but it should be understood that, in these examples, they are KDEs using a Gaussian kernel with standard deviation $\sigma$ of 0.3. FIG. 7A smoothed histogram 710, derived from FIG. 6A histogram 610, comprises a single mode and has a single peak 711. FIG. 7B smoothed histogram 720 is derived from FIG. 6B histogram 620, comprises two modes and has two peaks 721 and 722. The difference $T_{D45}$ 725 between the two peaks, 721 and 722, is related to the difference between two values of SIFS, as discussed above with reference to equation (5), that were used by the wireless target station 120 during the period 40 to 45 seconds. A "mode fraction" may be defined as the normalized percentage of data points that have converged to the specified mode and is related to the two peak values, a 730 and b 732. In this example, peak 722 represents the mode with the higher mode fraction, and peak 721 the mode with the lower mode fraction.

Figure 7C:
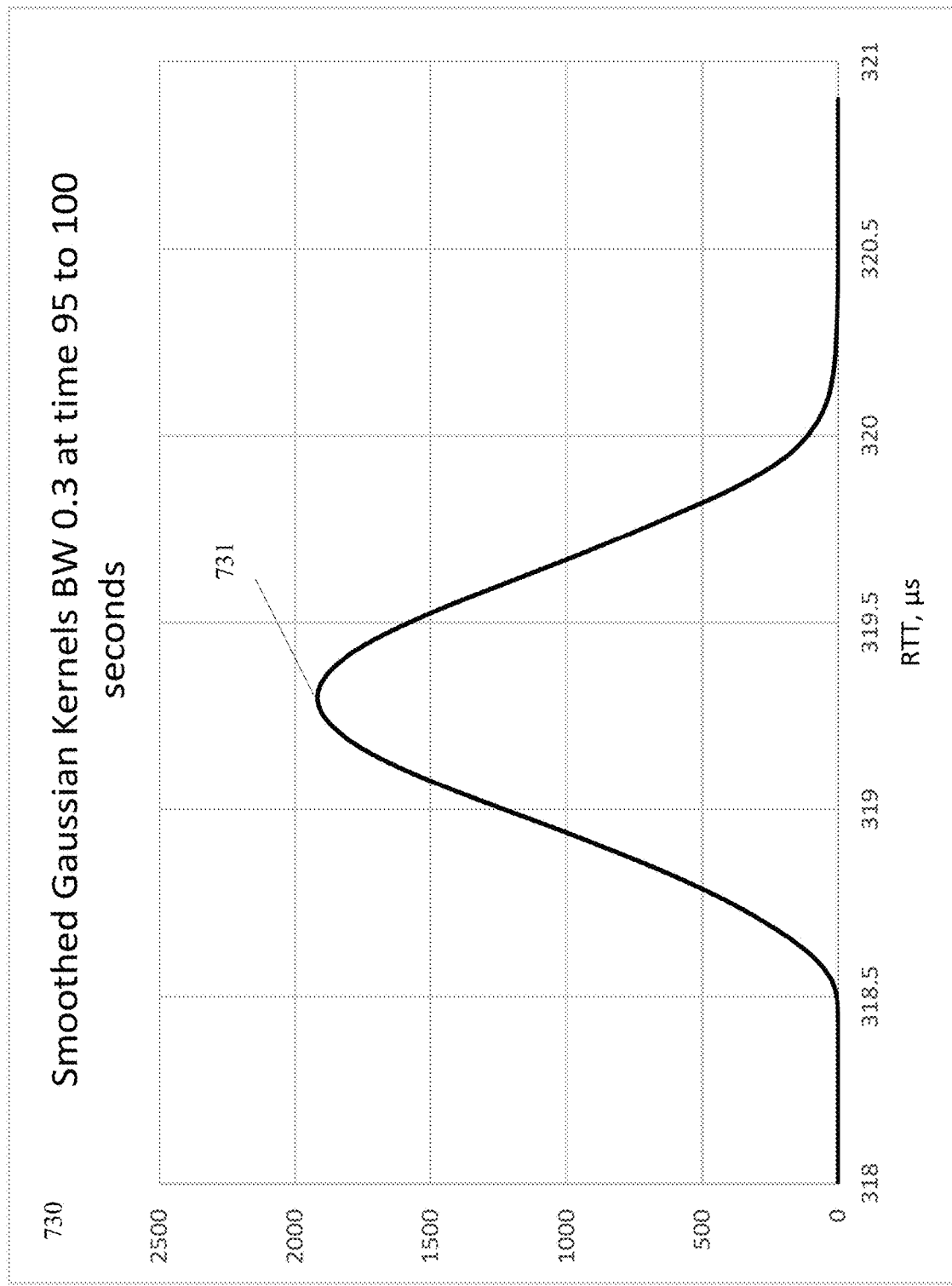

FIG. 7C is smoothed histogram 730, derived from FIG. 6C histogram 630, and comprises a single mode and has a single peak 731. FIG. 7D smoothed histogram 740, derived from FIG. 6D histogram 640, comprises two modes and has two peaks 741 and 742. The peak with the higher mode fraction is 741 and the peak with the lower mode fraction is 742. The difference $T_{D150}$ 745 between the two peaks, 741 and 742, is related to the two values of SIFS, as discussed above with reference to equation (5), that were used by the target station 120 during the period 145 to 150 seconds. Smoothed histograms 710 and 730 indicate a single SIFS mode during the 5 second time periods, whereas smoothed histograms 720 and 740 indicate dual SIFS modes.

The peak RTT values 711, 721, 722, 731, 741, and 742 may be determined by several methods based upon the application of KDE. It may be assumed that in the case of dual SIFS modes, the peaks will not be closer than 2 $\sigma$. The selection of $\sigma$=0.3 µs bandwidth for the Gaussian kernel is compatible with this expectation that the peaks due to different modes will not be closer than 2 $\sigma$.

For each 5 second period, the KDE of the measured RTTs may be determined and mode(s) and the corresponding peak or peaks estimated. The percentage of the RTTs that are within each mode, the mode fractions, may then be calculated.

Figure 8:
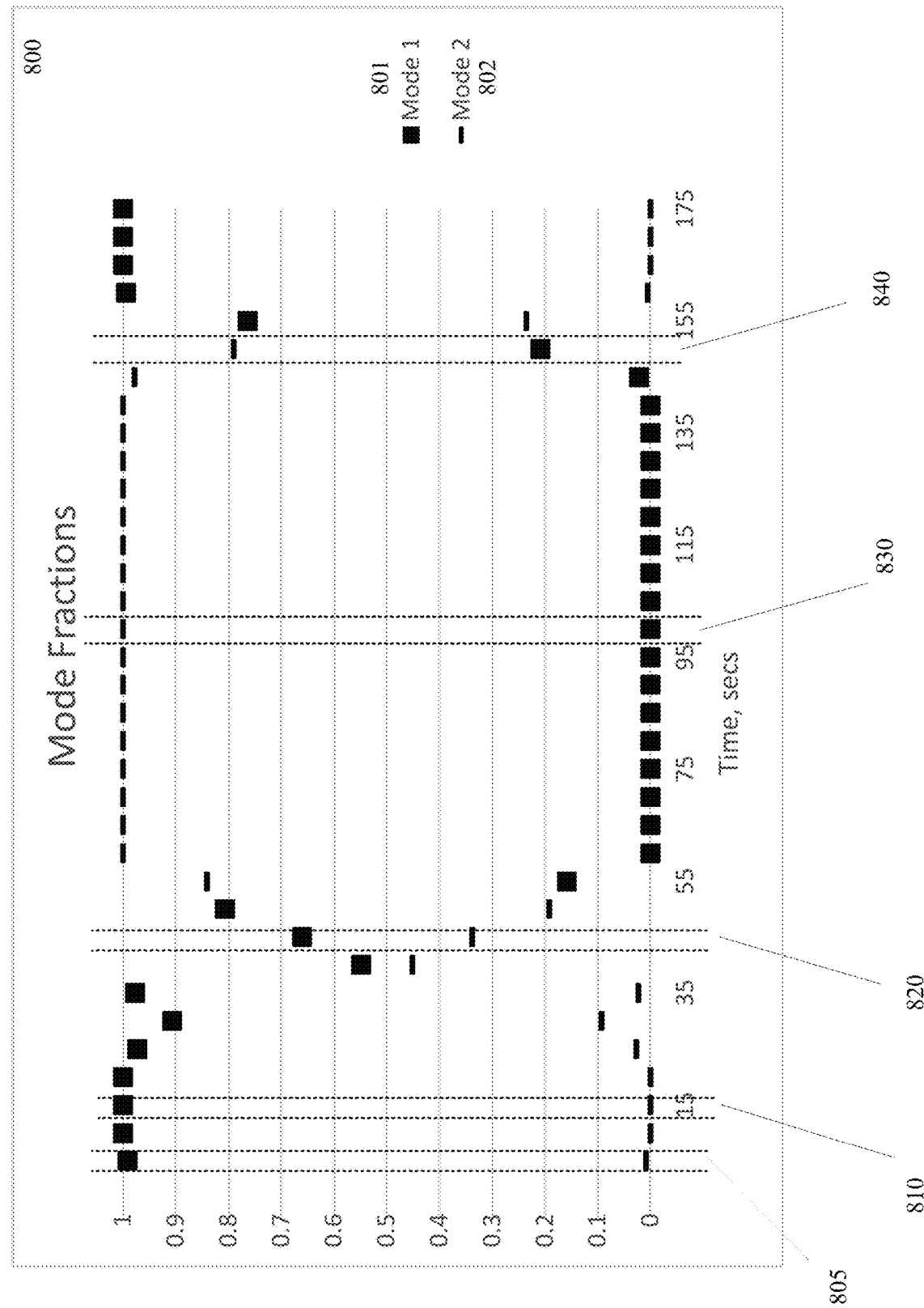
FIG. 8 is a graph of the mode fractions corresponding to the RTTs depicted in FIG. 5 calculated from the mode determination and peak values as discussed above with reference to FIGS. 6 and 7.

FIG. 8 is a graph of an example of the mode fractions corresponding to the RTTs depicted in FIG. 5, calculated from the mode determinations as discussed above with reference to FIGS. 6 and 7. Mode 1 is defined as the dominant SIFS mode at the beginning of the RTT collection, and mode 2 is the second SIFS mode. For time period 0 to 5 seconds 805, mode 1 801 mode fraction is dominant at about 98% whereas mode 2 802 mode fraction is only 2%. Hence, mode 1 corresponds to an SIFS value that is higher than the SIFS value corresponding to mode 2. FIG. 8 shows that at time 0 to 20 seconds, mode 1 801 dominated. The mode fraction for the time period 10 to 15 seconds 810, corresponds to the smoothed histogram 710 i.e., the KDE estimated density function, and is a single mode. At time 40 to 45 seconds 820, corresponding to smoothed histogram 720, there are the two modes: mode 1 fraction about 66% with mode 2 fraction at about 34%. At time 95 to 100 seconds 830, corresponding to smoothed histogram 730, there is just a single mode, in this case just mode 2. At time period 145 to 150 seconds 840, corresponding to smoothed histogram 740, there are again two modes, but now mode 2 is dominant; mode 1 fraction is about 22% with mode 2 fraction at about 78%.

The objective of this disclosure is to identify the SIFS mode and to adjust all the measured RTTs to correspond to a selected single SIFS mode. Having established the modes and the fractions a weighted average mode difference, $T_{Dave}$, may be calculated, if there are two modes present.

$$T_{Dave} = \frac{\text{Count} * \text{Previous } T_{Dave} + \text{Current } T_D}{\text{Count} + 1} \quad (6)$$

Where Count is the number of elapsed 5 second time periods.

As discussed above with reference to FIG. 8, mode 1 is established as the dominant mode at the beginning of the RTT measurements. Mode 1 may then be used as the reference mode, M1ref, and may be updated every 5 seconds. In general, the dominant mode, mode 1, at the beginning of the RTT measurements, including the case that there is a single mode, may be always taken as the reference mode, M1ref.

At each 5 second interval, it may be established, from the KDE, whether there is a single or dual modes, the reference mode value M1ref may be updated and the weighted average mode difference, $T_{Dave}$, calculated. It is then possible to check if the received RTT values are related to mode 1 or mode 2 SIFS and the mode 2 RTT values may be corrected by $T_{Dave}$ so as to align all the RTT values to an effective single mode, mode 1.

Figure 9:
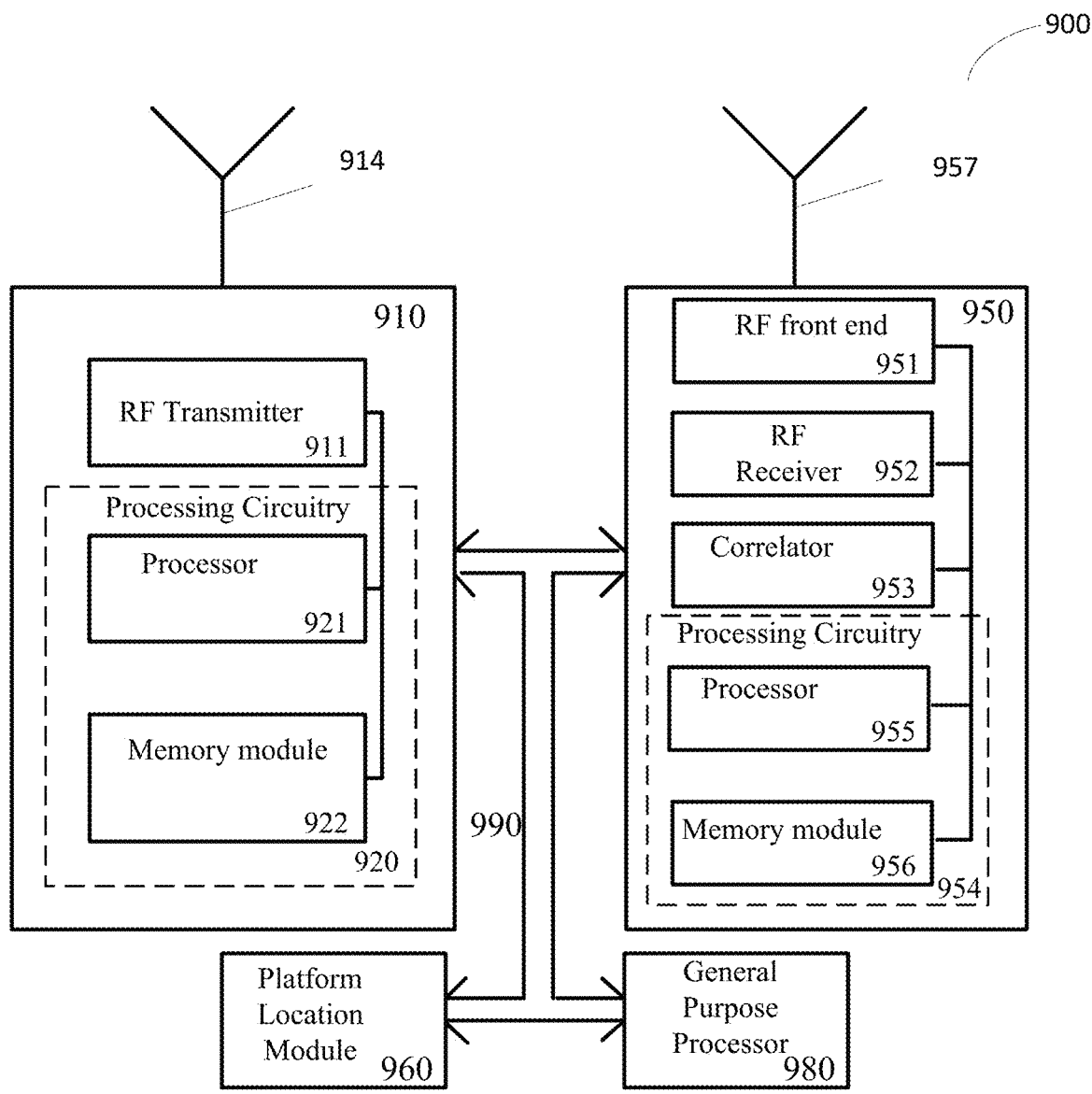
FIG. 9 illustrates a block diagram of an example wireless communication device which, according to an embodiment of the disclosure, may be used as or as part of the wireless device wireless measuring station.
Figure 10:
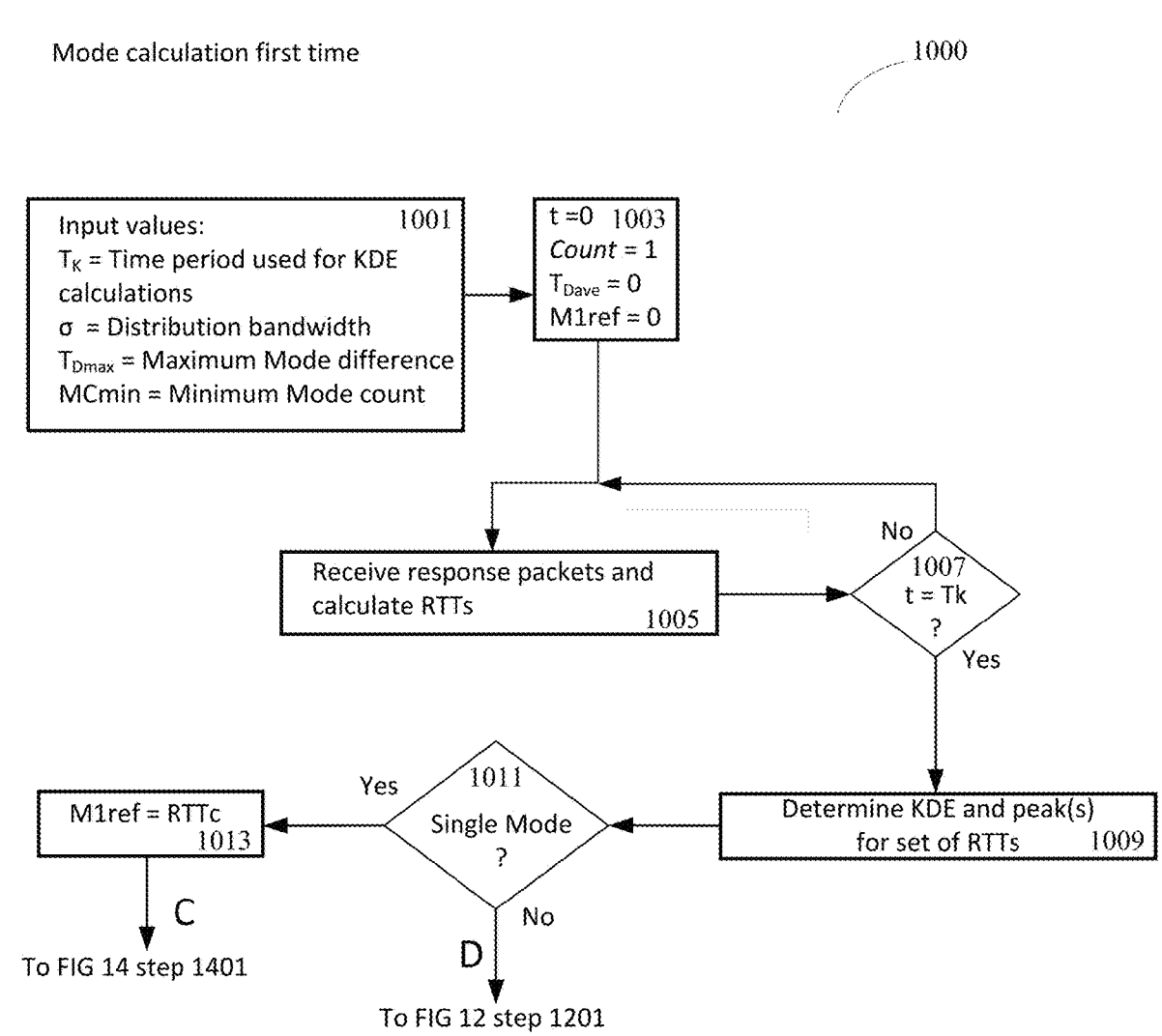
FIGS. 10, 11, 12, 13 and 14 are a flowchart of an exemplary process for determining if the response packets, received by a wireless communications device, are transmitted by a wireless target station that has more than one SIFS mode, estimating the mode difference and correcting the measured RTTs so as to align the RTTs to correspond to a single SIFS mode.

FIG. 9 illustrates a block diagram of an example wireless communication device 900 which, according to an embodiment of the disclosure, may be used as or as part of the wireless measuring station 110. The wireless communication device 900 may be any device capable of wirelessly receiving signals and transmitting signals and may be configured to execute any of the methods of the IEEE 802.11-2020 Standard. In some embodiments, wireless communication device 900 may be one or more stations or access points, and the like. Wireless communication device 900 may be one or more wireless devices that are based upon the IEEE 802.11-2020 specification and each may be configured to act as a transmitter or a receiver. The embodiment described herein is that where wireless communication device 900 includes a wireless transmitter 910 and a wireless receiver 950. The wireless communication device 900 may also include a platform location module 960 and a general purpose processor 980 which are interconnected to the wireless transmitter 910, and the wireless receiver 950 by a data bus 990.

In some embodiments, the wireless transmitter 910 includes an RF transmitter 911 and processing circuitry 920 that includes processor 921, and memory module 922. The RF transmitter 911 may perform the functions of modulation, as described in IEEE 802.11-2020 and amplification for the transmission of the Wi-Fi packets via antenna 914. In some embodiments the processing circuitry 920 and/or the processor 921 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments the functions of the RF transmitter 911 may be performed by processing circuitry 920. The processing circuitry 920 may be configured to control any of the methods and/or processes described herein and/or to cause such methods, and/or processes to be performed, e.g., by the RF transmitter 911. The memory module 922 may be configured to store data, programmatic software code and/or other information described herein. In some embodiments, the software may include instructions that, when executed by the processing circuitry 920, causes the processing circuitry 920 to perform the processes described herein with respect to the wireless transmitter 910.

In some embodiments, the wireless receiver 950 includes an RF front end 951, an RF receiver 952, a correlator 953, processing circuitry 954 that includes a processor 955 and a memory module 956. The RF front end 951 may perform the usual functions of an RF receiver front end such as low noise amplification, filtering and frequency down conversion so as to condition the received signal suitable for inputting to the RF receiver 952. The RF receiver 952 may perform the functions of demodulation of the Wi-Fi packet received via antenna 957. In some embodiments wireless transmitter 910 and wireless receiver 950 may share the same antenna array together with the appropriate RF switches, combiners and splitters.

In some embodiments RF receiver 952 may condition the received signal suitable for inputting to correlator 953. If present, correlator 953 performs the function of correlating the conditioned, demodulated received bits with the known bit pattern. The correlator 953 may comprise different circuitry dependent, in part, upon the modulation. When a correlation is used, the effective receiver sensitivity of the Wi-Fi packets may be significantly improved. If the received signal is too low for conventional reception, then the correlator may still indicate reception and the RTT may be measured. Methods using a correlator are known.

In some embodiments the RF receiver 952 and/or the correlator 953 and/or the processing circuitry 954 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments the functions of the RF receiver 952 and/or the correlator 953 may be performed by the processing circuitry 954. The processing circuitry 954 may be configured to control any of the methods and/or processes described herein and/or to cause such methods, and/or processes to be performed, e.g., by the wireless receiver 950. The memory module 956 is configured to store data, programmatic software code and/or other information described herein. In some embodiments, the software may include instructions that, when executed by the processing circuitry 954, causes the processing circuitry 954 to perform the processes described herein with respect to the wireless receiver 950.

According to this embodiment of the disclosure, the wireless receiver 950 may be configured to measure and monitor an input signal's attribute, such as may include one or more of a signal transmitted by wireless transmitter 910, data and control packets, and the response signal, including control packets, transmitted by an access point or station that may be based upon the IEEE 802.11-2020 Standard. Such packets may include data null, ACK, RTS and CTS packets. The memory module 956 may store instructions for executing any method mentioned in the IEEE 802.11-2020 Standard, input signals, and results of processing of the processor 955, signals to be outputted and the like. Processing circuitry 954 may output to the general purpose processor 980 attributes of the received packets 124 such as RTT.

According to an embodiment of the disclosure, the RF transmitter 911 may be configured to transmit signals and the processing circuitry 920 may be configured to prepare the transmitted signal attributes based upon the IEEE 802.11-2020 Standard. Such transmitted packets may include data packets, control packets and management packets. Such control packets may include RTS packets. The memory module 922 may store instructions for executing any method mentioned in the specification, input signals, and results of processing of the processor 921, signals to be outputted and the like.

According to another embodiment of the disclosure, the wireless receiver 950 may be configured to receive the transmissions of another target station, e.g., wireless target station 120, and the processing circuitry 954 may be configured to monitor an attribute of the transmissions of the other wireless communication device and determine the received times of packets from the other wireless communication device, as discussed above with reference to FIGS. 2 and 3.

According to an embodiment of the disclosure, the wireless transmitter 910 may be configured to transmit bursts 451 of packets to another wireless communication device, as described in FIG. 4, and the processor 921 may be configured to prepare the attributes of the ranging packet 212 to be transmitted. Processor 921 may also be configured to set the timing Tp 230 between each ranging packet 212 transmission, the number N of ranging packet 212 transmissions within each burst, the wait time Tw 471 between bursts, as well as the start and stop times for the sequence of bursts.

According to an embodiment of the disclosure, a general purpose processor 980 may be used to control the operations of the wireless communication device 900 and in particular the wireless transmitter 910 and wireless receiver 950. The general purpose processor 980 may provide an interface to a user via a keyboard, mouse and display allowing a user to select the attributes of the target, wireless target station 120, control the start and stop of the transmissions of ranging packets 212 and perform the calculations described herein for the correction of RTTs from a wireless target station 120 that is employing more than one SIFS value. The general purpose processor 980 may also carry out the various calculations as described in this disclosure, such as determining a location for the wireless target station 120 based upon the resulting RTTs, prepare the measurement results for disclosure to an operator or user, etc. . . . In some embodiments the general purpose processor 980 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions and may include a memory module to execute programmatic code stored in the general purpose processor or another device. It is also noted that the elements of the wireless communication device 900 can be included in a single physical device/housing or can be distributed among several different physical devices/housings.

According to an embodiment of the disclosure, a platform location module 960 may be used to input, via the data bus 990, to the general purpose processor 980 and/or the processing circuitry 920 and/or 954 the location of the platform that is carrying the wireless communication device 900. The platform location module 960 may comprise navigation equipment such as a GPS receiver and/or a gyro and may provide both the location and heading of the wireless communication device 900 to the general purpose processor 980, and processing circuitries 920 and 954. The location and heading of the wireless communication device 900, together with the corrected RTTs may be used by the general purpose processor 980 to calculate and display the location of the target, i.e., wireless target station 120. Geo-location of a device using RTTs and location of the wireless communication device is known.

A more complete understanding of the present disclosure, and the attendant advantages and features thereof, will be more readily understood by first defining the terms that are used in the following descriptions:

| | |
|---|---|
| Mode | The SIFS mode used by the wireless target station 120 |
| $T_K$ | The time period used to calculate KDE |
| Mode 1 | In the case of a single mode, the SIFS mode used by the wireless target station 120 for the initial $T_K$; In the case of a dual mode, the SIFS mode with the higher mode fraction for the initial $T_K$. |
| Mode 2 | A second SIFS mode used by the wireless target station 120, in addition to mode 1 |
| Count | The number of elapsed time periods $T_K$ |
| RTTc1 | Peak RTT for mode 1 for Count c |
| RTTc2 | Peak RTT for mode 2 for Count c |
| M1ref | Reference Mode 1 value |
| MCmin | Minimum mode count |
| $T_{Dc}$ | Mode separation measured for Count c |
| $T_{Dave}$ | Weighted average mode time difference |
| $T_{Dmax}$ | Maximum mode separation |
| $\sigma$ | Chosen distribution bandwidth |

FIGS. 10, 11, 12, 13 and 14 are sections of a flowchart of an exemplary process 1000 for determining if the response packets 224, received by a wireless communications device 900, are transmitted by a wireless target station 120 that has more than one SIFS mode, estimating the mode difference and correcting the measured RTTs so as to align the RTTs to correspond to a single SIFS mode.

The process 1000 may start with step 1001 where parameter values may be inputted. Input values may include $T_K$, $\sigma$, $T_{Dmax}$ and MCmin. Example values may be $T_K=5$ seconds, $\sigma=0.3$ μs, TDmax=2.5 μs and MCmin=10. These values may be entered via the general purpose processor 980 or maybe preset and stored in memory module 956. At step 1003, certain variable parameters may be initialized. Such parameters may include time t, Count, $T_{Dave}$ and M1ref. Count may be initialized to 1 and the others may be initialized to 0.

The process, in steps 1005 and 1007, includes transmitting, via the RF transmitter 911, for a time of $T_K$, a plurality of ranging packets 212, either continuously with a time Tp 350 between each transmission, or in a burst of N transmissions and a wait time Tw 471 between each burst as discussed above with reference to FIG. 4. The process includes receiving a plurality of response packets 224 via the wireless receiver 950, recording the transmission and reception times of the ranging and response packets, 212 and 224 respectively, and calculating and recording the RTT for each exchange as discussed above with reference to FIG. 3. The RTT calculation may be performed by processing circuitry 954 and the results recorded in memory module 956. If, at step 1007, the elapsed time is $T_K$, then at step 1009, the set of RTTs is examined, the KDE and its modes/peaks calculated, and a determination made as to if there is one or two modes and corresponding peaks. The KDE calculations and peak determination may be performed by processing circuitry 954 and the results recorded in memory module 956 and/or by general purpose processor 980. At step 1011, it is checked if there are one or two modes and corresponding peaks in the KDE. The minimum mode count MCmin may be used to determine if a peak is valid. For example, if a peak is less than MCmin, then that peak may be ignored. If at step 1011 it is determined that there is only a single peak, RTTc, then at step 1013, M1ref is set to that RTT value, RTTc, $$M1\text{ref}=\text{RTTc}.$$

Figure 14:
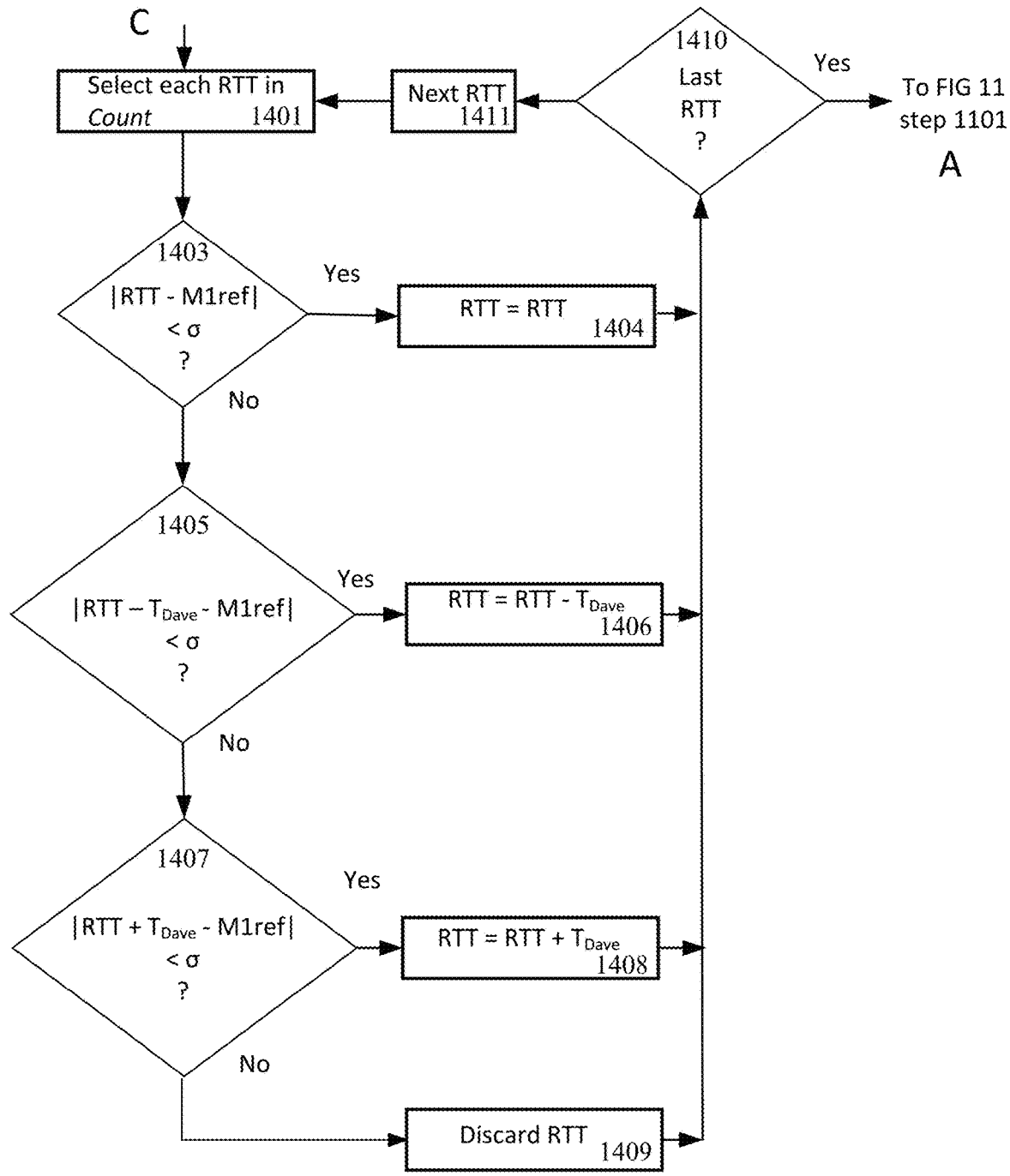

The process then advances to FIG. 14 step 1401. If, at step 1011, it is determined that there are two peaks, then the process advances to FIG. 12, step 1201.

In the general sense, in order to determine a value for the mode difference TD, either a KDE with dual modes (two peaks) must first be received, or KDEs with single modes corresponding to each mode must be received. Also, it may be noted that if the target station 120 is only using a single SIFS mode, then Tp will always be 0.

Figure 12:
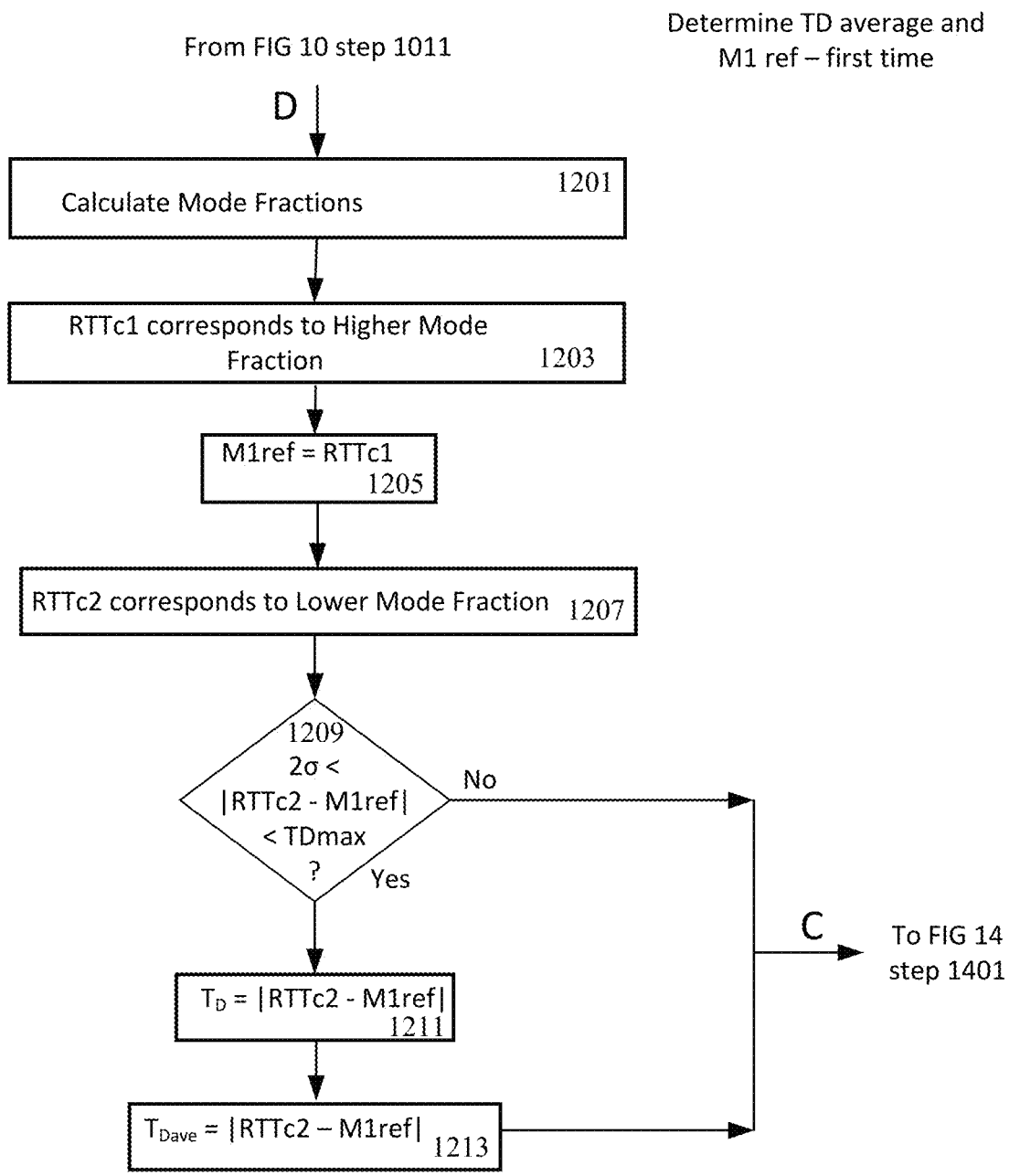

The process depicted in FIG. 12 is only used if the initial Count 1 set of RTTs has more than a single mode, i.e., not a single mode as determined in step 1011. In step 1201, the mode fractions of the two highest peaks are determined, as discussed above with reference to FIG. 7B histogram 720 and FIG. 8. In step 1203, RTTc1 is set to the RTT peak corresponding to the higher mode fraction, and in step 1205, M1ref is set to RTTc1. In step 1207, RTTc2 is set to the RTT peak corresponding to the lower mode fraction, and at step 1209 a check is made that RTTc2 is a valid second mode.

$$2\sigma<|\text{RTTc2}-M1\text{ref}|<TD\text{max}$$

If the check fails, then the process continues to FIG. 14 step 1401. If the check passes, then in step 1211, Tp is set to the difference between RTTc2 and M1ref, $$TD=|\text{RTTc2}-M1\text{ref}|$$

and in step 1213, $T_{Dave}$ is also set to the difference between RTTc2 and M1ref.

$$T_{Dave}=|\text{RTTc2}-M1\text{ref}|$$

And the process advances to FIG. 14 step 1401.

In other words, if the first set of RTT results, Count 1, in time period 0 to $T_K$, result in a KDE with two modes/peaks, then the peak corresponding to the higher mode fraction is the mode reference, M1ref, and the mode difference Tp and average mode difference $T_{Dave}$ is set to the RTT difference between the two peaks. If, however, the first set of RTT results, Count 1, in time period 0 to $T_K$, result in a KDE with a single peak, then that RTT value is set as the mode reference M1ref and the mode differences Tp and $T_{Dave}$ remain zero.

Figure 11:
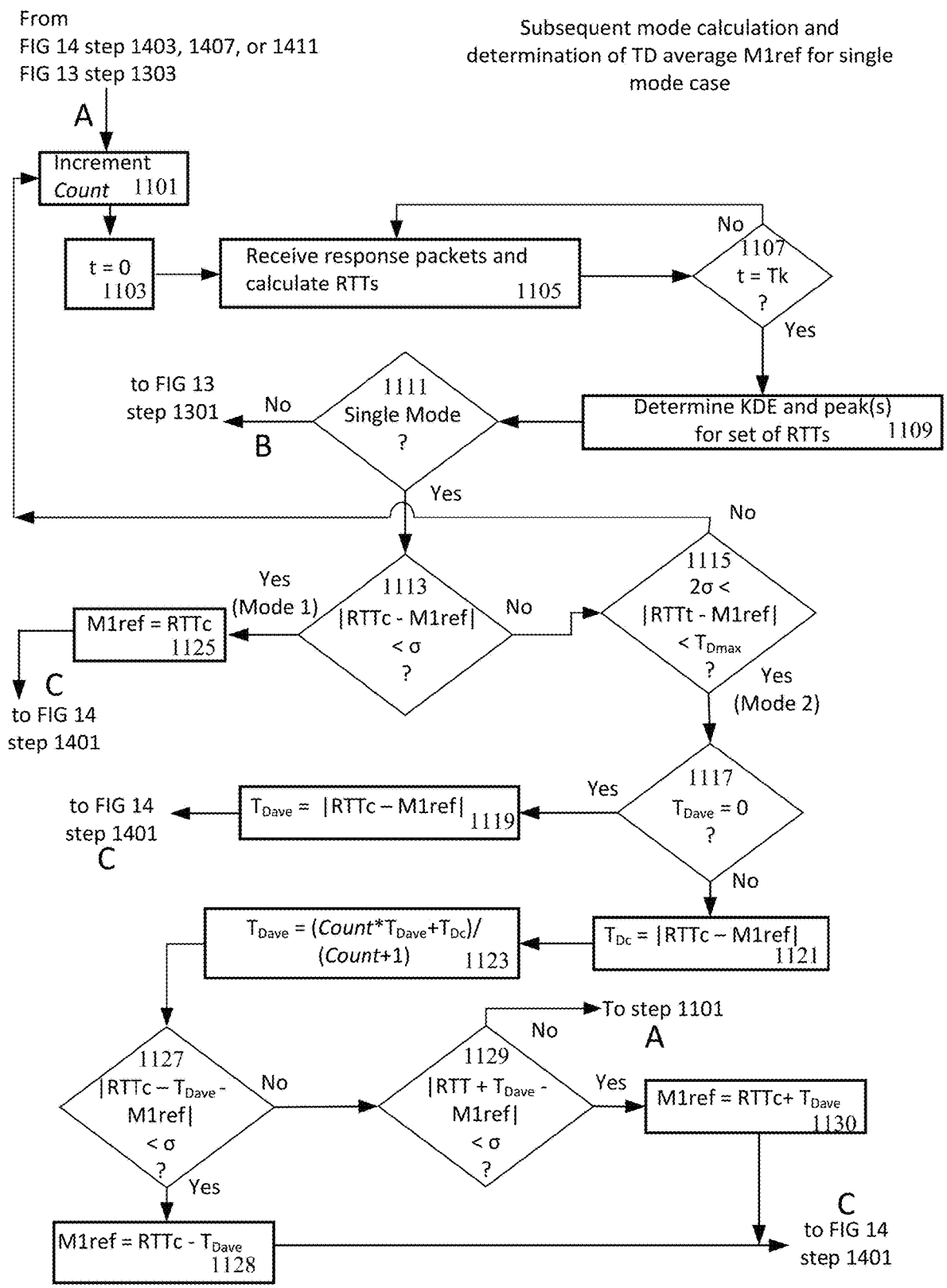

The steps in FIG. 11 form the main part of process 1000 for the second and subsequent sets of RTTs, i.e., Count 2 and higher.

At step 1101, Count is incremented, and at step 1103, the timer t is reset to 0. Steps 1105, 1107, and 1109 perform the same functions as steps 1005, 1007, and 1009, resulting in a set of RTTs and the KDE modes/peaks for a period of $T_K$. Similar to step 1011, at step 1111, it is checked if there are one or two modes/peaks in the KDE. The minimum mode count MCmin may be used to determine if a peak is valid. If at step 1111 it is determined that there is only a single peak, RTTc, then at step 1113, the difference between RTTc and M1ref is checked to see if RTTc is due to mode 1 or mode 2.

If |RTTc−M1ref|<σ, then RTTc=mode 1

If the difference is less than σ, then RTTc is due to mode 1 and in step 1125, M1ref is set to RTTc. The process then advances to FIG. 14 step 1401.

If, at step 1113, |RTTc−M1ref|>σ, then at step 1115 a check is made that the difference is greater than 2 σ and less than $T_{Dmax}$, i.e., RTTc is a valid mode 2, where:

2σ<|RTTc−M1ref|<$T_{Dmax}$

If true, then RTTc is due to mode 2. At step 1117, it is checked if $T_{Dave}$=0. If it is, then this is the first occurrence of a mode 2 and a mode difference TD can be established. Hence, at step 1119 $T_{Dave}$ is set to the difference between RTTc and M1ref.

$T_{Dave}$=|RTTc−M1ref|

The process then advances to FIG. 14 step 1401.

If at step 1117, $T_{Dave}$ has a non-zero value, then at step 1121 $T_{Dc}$ is set to the difference between RTTc and M1ref.

$T_{Dc}$=|RTTc−M1ref|

At step 1123, the value for $T_{Dave}$ is updated, as discussed above with reference to equation (6).

$T_{Dave}$=(Count*$T_{Dave}$+$T_{Dc}$)/(Count+1)

Steps 1127 to 1130 update the value of M1ref. At step 1127, it is checked if

|RTTC−$T_{Dave}$−M1ref|<σ and if true, then at step 1128

M1ref=RTTc−$T_{Dave}$

If the check at step 1127 fails, then at step 1129 it is checked if

|RTTc+$T_{Dave}$−M1ref|<σ and if true, then at step 1128

M1ref=RTTc+$T_{Dave}$

The process then advances to FIG. 14 step 1401.

Figure 13:
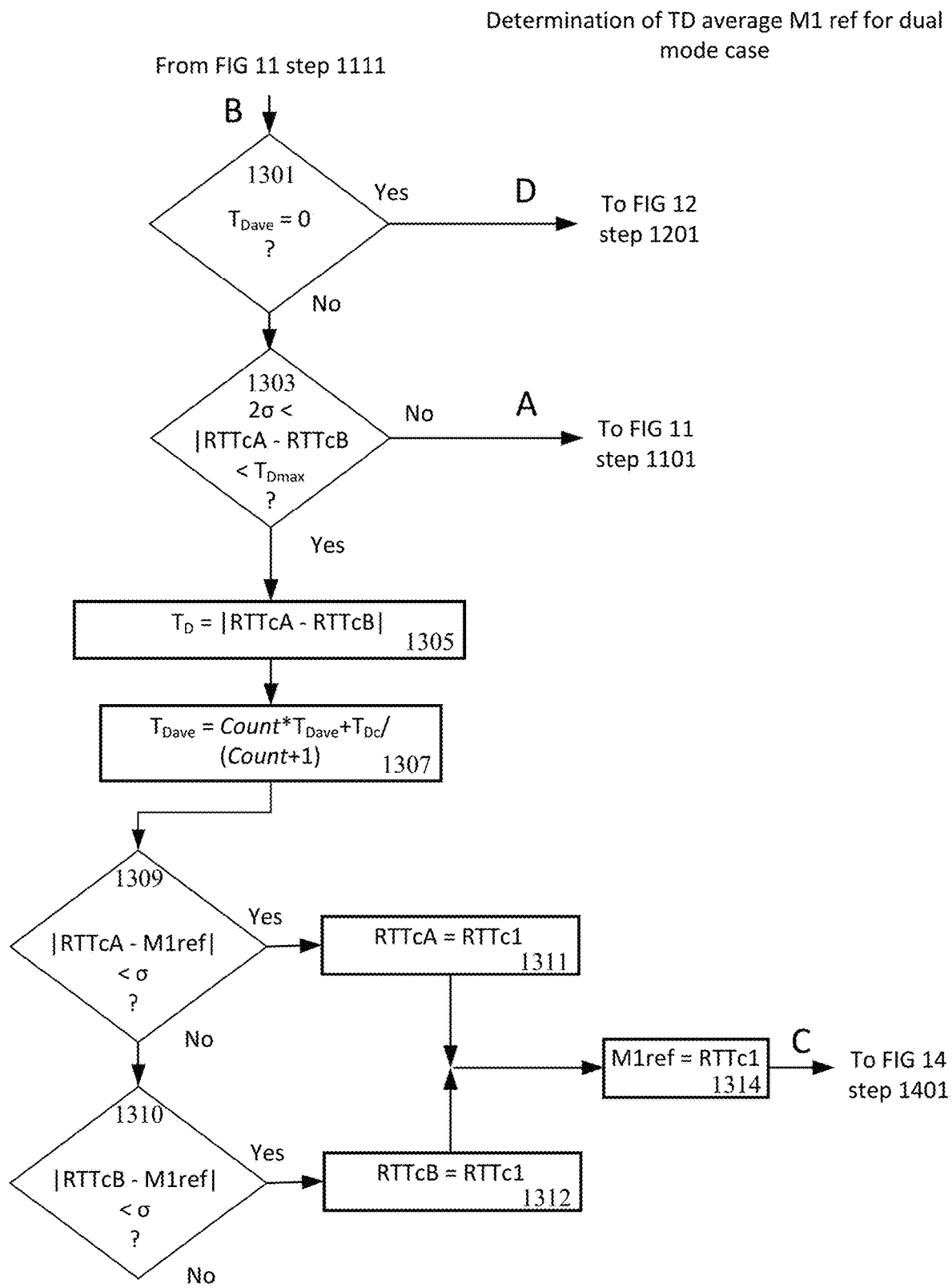

If, at step 1111, it is determined that the KDE derived in step 1109 consists of dual modes, then the process advances to FIG. 13 step 1301.

The steps in FIG. 13 examine dual modes detected at step 1111. At step 1301, it is checked if $T_{Dave}$ has a zero value. If it is zero, then this is the first occurrence of a dual mode or a mode 2 and hence the process advances to FIG. 12 step 1201. If $T_{Dave}$ has a non-zero value, then at step 1303 it is checked that the two peaks, RTTcA and RTTcB are spaced more than 2σ apart and less than $T_{Dmax}$, i.e., there are two valid modes/peaks present.

2σ<|RTTcA−RTTcB|<$T_{Dmac}$

If the check at step 1303 fails then the process returns to FIG. 11 step 1101. If the check at step 1303 passes, then at step 1305 TD is set to the difference between the two peaks.

TD=|RTTCA−RTTcB| and at step 1307 the value for $T_{Dave}$ is updated according to equation (6).

$T_{Dave}$=(Count*$T_{Dave}$+$T_{Dc}$)/(Count+1)

Steps 1309 to 1314 determine whether RTTcA or RTTcB corresponds to mode 1 and then sets M1ref accordingly.

At step 1309, it is checked if the difference between RTTcA and M1ref is less than σ. If it is, then at step 1311, RTTc1 is set equal to RTTcA, i.e., RTTcA corresponds to mode 1.

If |RTTcA−M1ref|<σ, then RTTc1=RTTcA

Otherwise, at step 1310 it is checked if the difference between RTTcA and M1ref is less than σ. If it is, then at step 1312, M1ref is set equal to RTTcB, i.e., RTTcB corresponds to mode 1, and:

If |RTTcB−M1ref|<σ, then RTTc1=RTTcB

Then at step 1314 M1ref is set to RTTc1 and the process advances to FIG. 14 step 1401.

M1ref=RTTc1

The steps in FIG. 14 examine each RTT received during each Count, identifies if they correspond to mode 1 or mode 2, and then corrects the mode 2 RTT values by adding or subtracting the $T_{Dave}$ value that was derived for that Count.

At step 1401, each RTT is selected, and at step 1403, each is first checked to determine if the RTT is within σ of M1ref,

|RTT−M1ref|<σ

If true, then that RTT corresponds to mode 1and is retained, as is, in step 1404 and the process advances to step 1410. If false, then at step 1405 it is checked if

|RTT−TDave−M1ref|<σ.

If it is, then in step 1406, that RTT is corrected to a 'mode 1' value

RTT=RTT−$T_{Dave}$, and the process advances to step 1410. If step 1405 fails, then in step 1407 it is checked if

|RTT+TDave−M1ref|<σ

If it is, then in step 1406, that RTT is corrected to a higher 'mode 1' value, where:

RTT=RTT+$T_{Dave}$, and the process advances to step 1410. If step 1407 fails, then that RTT is discarded. After steps 1404, 1406, 1408, or 1409, at step 1410 it is checked if all the RTTs in that Count have been corrected. If not, then at step 1411, the next RTT is selected, and the process returns to step 1401 to examine the next RTT. If all RTTs have been corrected, then the process returns to step 1101 in FIG. 11.

The procedures described in process 1000 may be performed by processing circuitry 954 and/or general purpose processor 980. The corrected RTTs may be stored in memory module 956 and/or general purpose processor 980 for further processing in order to calculate the location of wireless target station 120.

Figure 15:
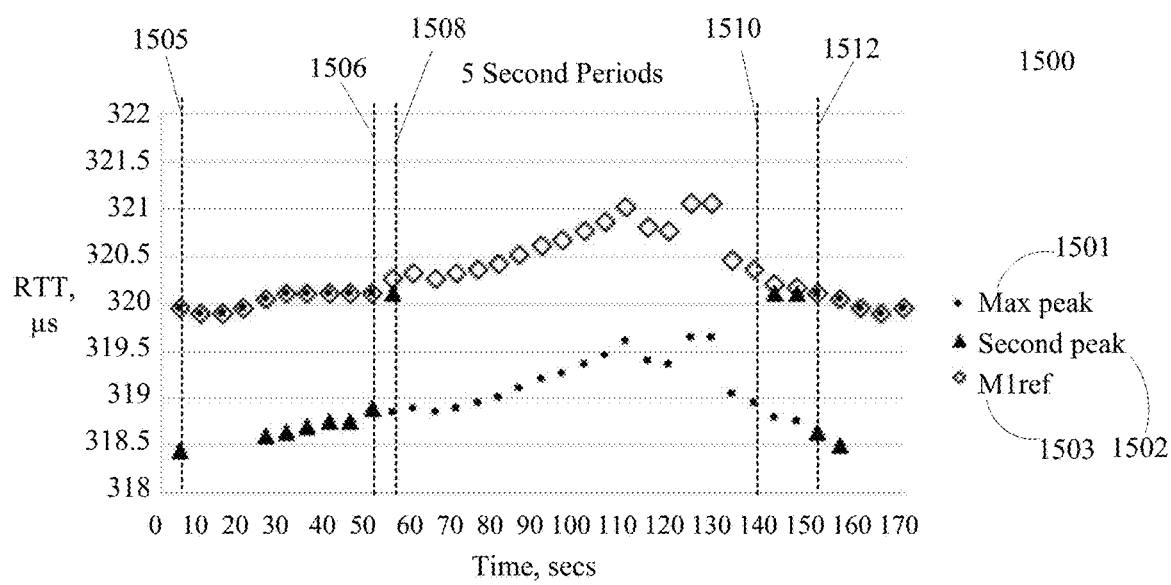
FIG. 15 is a graph 1500 showing the maximum peak 1501, a second peak 1502 (if present), and the M1ref value 1503 for each 5 second period of the RTTs as depicted in FIG. 5, which is the set of RTTs used as the example in this disclosure.

FIG. 15 is a graph 1500 showing the maximum peaks 1501, the second peaks 1502 (if present), and the M1ref values 1503 for each 5 second period of the set of RTTs depicted in FIG. 5, which is the set of RTTs used as the example in this disclosure. The peaks 1501 and 1502 and the M1ref 1503 values are derived for every 5 second interval as described above with reference to the exemplary process 1000 in flow diagram FIGS. 10, 11, 12, 13, and 14. After the initial $T_K$ period, 1505, where $T_K$=5 seconds, two modes/ peaks were present, one at about 320 µs and the other at about 318.4 µs. The peak at about 320 µs has the higher mode fraction as discussed above with reference to FIG. 8, time period 805, and is therefore selected as mode 1, and M1ref is set to that RTT value. The mode difference Tp and $T_{D_{ave}}$ are then set equal to the difference between the RTT values of the two peaks. The higher RTT value is either a single mode or the higher mode fraction up to time 50 seconds, 1506, and the M1ref value tracks the mode 1 peak 1501. The value for $T_{D_{ave}}$ is adjusted as per equation (6) whenever two modes are present. At time 55 seconds, 1508, there are two modes/peaks but the higher mode fraction now corresponds to the lower mode 2 RTTc value. $T_{D_{ave}}$ is adjusted as per equation (6) and M1ref is adjusted based upon the mode 2 RTTc value. From time 60 until time 140 seconds, 1510, only mode 2 RTTs are present, and the M1ref values follow the mode 2 RTTc values plus $T_{D_{ave}}$. At time 155 seconds 1512, mode 1 RTTs again have the higher mode fraction and the M1ref value again corresponds to mode 1 RTTc value. It may be observed that in FIG. 5 it appears that there are two modes for much of the time, whereas in FIGS. 8 and 15 there are much shorter periods when two modes are shown to be present. This is due to the application of a minimum mode count, MCmin which effectively deletes RTTs in one mode if the number of RTTs is low (below a predetermined threshold).

Figure 16:
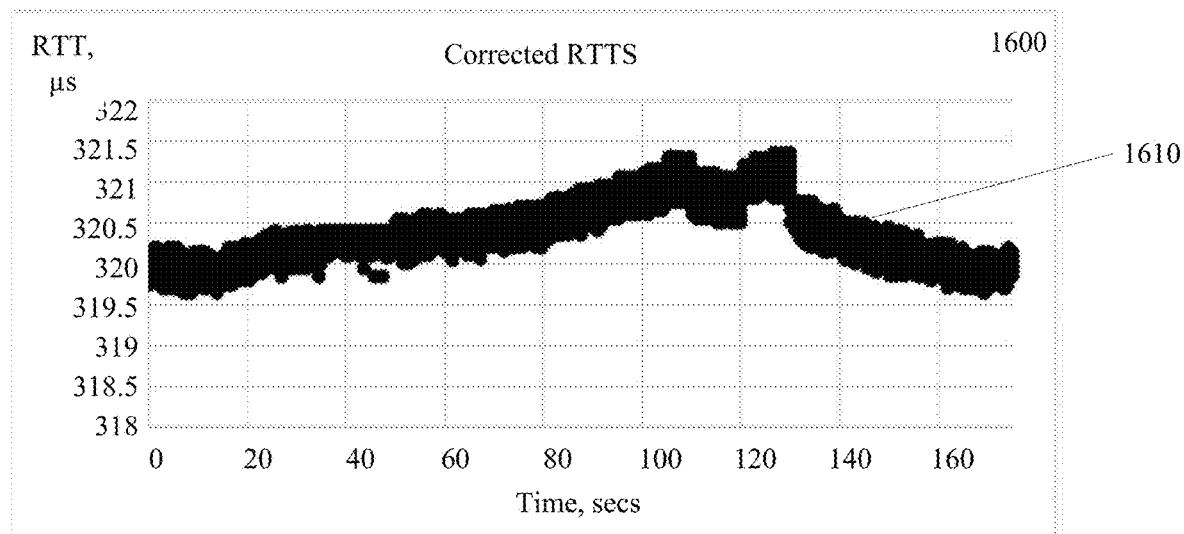
FIG. 16 is a scatter plot 1600 of the corrected RTTs 1610 after the original set of RTTs as shown in FIG. 5 have been processed as described in the exemplary process.

FIG. 16 is a scatter plot 1600 of the corrected RTTs 1610 after the original set of RTTs, as shown in FIG. 5, have been processed as described in the exemplary process 1000. The resulting effectively single mode set of RTTs is now suitable for further processing to establish the corresponding distances and hence the location of the target station 120.

Process 1000 is described above assuming that the wireless target station 120 is using either a single SIFS mode or two SIFS modes. It is possible that the wireless target station 120 may be using more than two SIFS modes. If there are more than two SIFS modes, then process 1000 will effectively discard any RTT values due to any modes/peaks beyond the first two modes encountered. In the general sense, the number of RTTs that are discarded is negligible.

FIG. 17 shows an example process performed by a first wireless device. The method in a is for adjusting a first set of RTTs that correspond to at least two short interframe spacing (SIFS) modes and result from communication with a second WD. The first set of RTTs include a first subset of RTTs that correspond to a first SIFS mode and a second subset of RTTs that correspond to a second SIFS mode. The first set of RTTs is adjusted to correspond to an adjusted single SIFS mode. The method includes determining (Block S1701) one RTT of the first set of RTTs, for each of a set of ranging and response signal pairs associated with the communication with the second WD. The method further includes, at set intervals ($T_K$), determining (Block S1703) a set of mode peaks of the first set of RTTs, determining (Block S1705) that the first SIFS mode has the highest mode peak of the set of mode peaks and selecting the first SIFS mode as a reference mode, and determining (Block S1707) that the second SIFS mode has the second highest peak of the set of mode peaks. The method further includes, at set intervals ($T_K$), determining (Block S1709) a mode difference (TD) between highest mode peak of the first SIFS mode and the second highest peak of the second SIFS mode and adjusting (Block S1711) the second subset of RTTs that correspond to the second SIFS mode at least by adding or subtracting Tp to each RTT of the second subset of RTTs. In addition, the method includes determining (Block S1713) a second set of RTTs comprising the first subset of RTTs and the adjusted second subset of RTTs. The second set of RTTs corresponds to the adjusted single SIFS mode and is usable to determine a location of the second WD.

In some embodiments, the set of mode peaks are determined using Kernel Density Estimation (KDE).

In some other embodiments, the KDE uses Gaussian kernels with standard deviation σ.

In some embodiments, the method further includes determining an averaged mode difference, $T_{D_{ave}}$, that is updated every interval $T_K$ using a weighted average:

$$T_{Dave} = \frac{Count * Previous\ T_{Dave} + Current\ T_D}{Count + 1}$$

Count being the number of elapsed $T_K$ intervals.

In some embodiments, the method further includes determining that a separate mode peak of the set of mode peaks exists when an RTT value of the separate mode peak is separated by at least 2 σ from another RTT value.

In some other embodiments, the method further includes determining a first mode reference value, M1ref, corresponding to the reference mode based on at least one RTT of the first subset.

In some embodiments, the method further includes updating M1ref based on:
  if the first set of RTTs includes only a single peak, RTTc:
    if |RTTc−M1ref|<standard deviation σ, then RTTc corresponds to the first SIFS mode and M1ref=RTTc;
    if |RTTc−M1ref|>2 σ, then RTTc corresponds to the second SIFS mode; and
    if |RTTC−$T_{Dave}$−M1ref|<σ, then M1ref=RTTc−$T_{Dave}$, $T_{Dave}$ being a weighted average mode time difference;
    if |RTTc+$T_{Dave}$−M1ref|<σ, then M1ref=RTTc+$T_{Dave}$;
    else, discarding the RTTc.
  if the first set of RTTs includes a first peak, RTTcA, and a second peak, RTTcB:
    if |RTTcA−M1ref|<σ, then RTTcA corresponds to the first SIFS mode and M1ref=RTTcA; and
    if RTTCB-M1ref|<σ, then RTTcB is the first SIFS mode and M1ref=RTTcB.

In some other embodiments, the method further includes, after each interval $T_K$, processing each RTT in that time interval by:
  retaining the RTT if |RTT−M1ref|<σ;
  adjusting the RTT to be RTT=RTT-$T_{Dave}$, if |RTT-$T_{Dave}$−M1ref|<σ;
  adjusting the RTT to be RTT=RTT+$T_{Dave}$, if |RTT+$T_{Dave}$−M1ref|<σ; and
  else, discarding the RTT.

In some embodiments, the first WD and the second WD are compliant with Institute of Electrical and Electronics Engineers (IEEE) 802.11 Standard.

In some embodiments, in the first WD is a wireless measuring station 110, and the second WD is a wireless target station 120.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the use of transmissions in a burst or continuous transmissions, the use or not of a reception window, the start and end times of a reception window, if used, the assumed maximum jitter of the turnaround time (SIFS) of a response signal and selection of a bandwidth parameter σ, the choice of value for $T_K$, the method used to determine the KDEs. Accordingly, the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following embodiments.

What is claimed is:

1. A method in a first wireless device (WD) for adjusting a first set of RTTs that correspond to at least two short interframe spacing (SIFS) modes and result from communication with a second WD, the first set of RTTs comprising a first subset of RTTs that correspond to a first SIFS mode and a second subset of RTTs that correspond to a second SIFS mode, the first set of RTTs being adjusted to correspond to an adjusted single SIFS mode, the method comprising:
   determining one RTT of the first set of RTTs, for each of a set of ranging and response signal pairs associated with the communication with the second WD;
   at set intervals ($T_K$):
      determining a set of mode peaks of the first set of RTTs;
      determining that the first SIFS mode has the highest mode peak of the set of mode peaks and selecting the first SIFS mode as a reference mode;
      determining that the second SIFS mode has the second highest peak of the set of mode peaks;
      determining a mode difference (TD) between highest mode peak of the first SIFS mode and the second highest peak of the second SIFS mode; and
      adjusting the second subset of RTTs that correspond to the second SIFS mode at least by adding or subtracting TD to each RTT of the second subset of RTTs; and
   determining a second set of RTTs comprising the first subset of RTTs and the adjusted second subset of RTTs, the second set of RTTs corresponding to the adjusted single SIFS mode and being usable to determine a location of the second WD.

2. The method of claim 1, wherein the set of mode peaks are determined using Kernel Density Estimation (KDE).

3. The method of claim 2, wherein the KDE uses Gaussian kernels with standard deviation σ.

4. The method of claim 1, wherein the method further includes:
   determining an averaged mode difference, $T_{Dave}$, that is updated every interval $T_K$ using a weighted average:

$$T_{Dave} = \frac{\text{Count} * \text{Previous } T_{Dave} + \text{Current } T_D}{\text{Count} + 1}$$

Count being the number of elapsed $T_K$ intervals.

5. The method of claim 1, wherein the method further includes:
   determining that a separate mode peak of the set of mode peaks exists when an RTT value of the separate mode peak is separated by at least 2 σ from another RTT value.

6. The method of claim 1, wherein the method further includes:
   determining a first mode reference value, M1ref, corresponding to the reference mode based on at least one RTT of the first subset.

7. The method of claim 6, wherein the method further includes updating M1ref based on:
   if the first set of RTTs includes only a single peak, RTTc:
      if |RTTc−M1ref|<standard deviation σ, then RTTc corresponds to the first SIFS mode and M1ref=RTTc;
      if |RTTc−M1ref|>2 σ, then RTTc corresponds to the second SIFS mode; and
      if |RTTc−$T_{Dave}$−M1ref|<σ, then M1ref=RTTc−$T_{Dave}$, $T_{Dave}$ being a weighted average mode time difference;
      if |RTTc+$T_{Dave}$−M1ref|<σ, then M1ref=RTTc+$T_{Dave}$;
      else, discarding the RTTc;
   if the first set of RTTs includes a first peak, RTTcA, and a second peak, RTTcB:
      if |RTTcA−M1ref|<σ, then RTTcA corresponds to the first SIFS mode and M1ref=RTTCA; and
      if |RTTCB−M1ref|<σ, then RTTcB is the first SIFS mode and M1ref=RTTcB.

8. The method of claim 1, wherein the method further includes:
   after each interval $T_K$, processing each RTT in that time interval by:
      retaining the RTT if |RTT−M1ref|<σ;
      adjusting the RTT to be RTT=RTT-$T_{Dave}$, if |RTT−$T_{Dave}$−M1ref|<σ;
      adjusting the RTT to be RTT=RTT+$T_{Dave}$, if |RTT+$T_{Dave}$−M1ref|<σ; and
      else, discarding the RTT.

9. The method of claim 1, wherein the first WD and the second WD are compliant with Institute of Electrical and Electronics Engineers (IEEE) 802.11 Standard.

10. The method of claim 1, wherein the first WD is a wireless measuring station, and the second WD is a wireless target station.

11. A first wireless device (WD) configured for adjusting a first set of RTTs that correspond to at least two short interframe spacing (SIFS) modes and result from communication with a second WD, the first set of RTTs comprising a first subset of RTTs that correspond to a first SIFS mode and a second subset of RTTs that correspond to a second SIFS mode, the first set of RTTs being adjusted to correspond to an adjusted single SIFS mode, the first WD comprising processing circuitry configured to:
   determine one RTT of the first set of RTTs, for each of a set of ranging and response signal pairs associated with the communication with the second WD;
   at set intervals ($T_K$):
      determine a set of mode peaks of the first set of RTTs;
      determine that the first SIFS mode has the highest mode peak of the set of mode peaks and selecting the first SIFS mode as a reference mode;
      determine that the second SIFS mode has the second highest peak of the set of mode peaks;
      determine a mode difference (TD) between highest mode peak of the first SIFS mode and the second highest peak of the second SIFS mode; and
      adjust the second subset of RTTs that correspond to the second SIFS mode at least by adding or subtracting TD to each RTT of the second subset of RTTs; and
   determine a second set of RTTs comprising the first subset of RTTs and the adjusted second subset of RTTs, the second set of RTTs corresponding to the adjusted single SIFS mode and being usable to determine a location of the second WD.

12. The first WD of claim 11, wherein the set of mode peaks are determined using Kernel Density Estimation (KDE).

13. The first WD of claim 12, wherein the KDE uses Gaussian kernels with standard deviation σ.

14. The first WD of claim 11, wherein the processing circuitry is further configured to:
   determine an averaged mode difference, $T_{Dave}$, that is updated every interval $T_K$ using a weighted average:

$$T_{Dave} = \frac{Count * \text{Previous } T_{Dave} + \text{Current } T_D}{Count + 1}$$

Count being the number of elapsed $T_K$ intervals.

15. The first WD of claim 11, wherein the processing circuitry is further configured to:
   determine that a separate mode peak of the set of mode peaks exists when an RTT value of the separate mode peak is separated by at least 2 σ from another RTT value.

16. The first WD of claim 11, wherein the processing circuitry is further configured to:
   determine a first mode reference value, M1ref, corresponding to the reference mode based on at least one RTT of the first subset.

17. The first WD of claim 16, wherein the processing circuitry is further configured to update M1ref based on:
   if the first set of RTTs includes only a single peak, RTTc:
      if |RTTc−M1ref|<standard deviation σ, then RTTc corresponds to the first SIFS mode and M1ref=RTTc;
      if |RTTc−M1ref|>2 σ, then RTTc corresponds to the second SIFS mode; and
      if |RTTc−$T_{Dave}$−M1ref|<σ, then M1ref=RTTc−$T_{Dave}$, $T_{Dave}$ being a weighted average mode time difference;
      if |RTTc+$T_{Dave}$−M1ref|<σ, then M1ref=RTTc+$T_{Dave}$;
      else, discarding the RTTc;
   if the first set of RTTs includes a first peak, RTTcA, and a second peak, RTTcB:
      if |RTTcA−M1ref|<σ, then RTTcA corresponds to the first SIFS mode and M1ref=RTTCA; and
      if |RTTcB−M1ref|<σ, then RTTcB is the first SIFS mode and M1ref=RTTcB.

18. The first WD of claim 11, wherein the processing circuitry is further configured to:
   after each interval $T_K$, process each RTT in that time interval by:
      retaining the RTT if |RTT−M1ref|<σ;
      adjusting the RTT to be RTT=RTT−$T_{Dave}$, if |RTT−$T_{Dave}$−M1ref|<σ;
      adjusting the RTT to be RTT=RTT+$T_{Dave}$, if |RTT+$T_{Dave}$−M1ref|<σ; and
      else, discarding the RTT.

19. The first WD of claim 11, wherein one or more of:
   the first WD and the second WD are compliant with Institute of Electrical and Electronics Engineers (IEEE) 802.11 Standard;
   the first WD is a wireless measuring station; and
   the second WD is a wireless target station.

20. A system comprising a first wireless device (WD) and a second WD, the first WD being configured for adjusting a first set of RTTs that correspond to at least two short interframe spacing (SIFS) modes and result from communication with a second WD, the first set of RTTs comprising a first subset of RTTs that correspond to a first SIFS mode and a second subset of RTTs that correspond to a second SIFS mode, the first set of RTTs being adjusted to correspond to an adjusted single SIFS mode, the first WD comprising processing circuitry configured to:

determine one RTT of the first set of RTTs, for each of a set of ranging and response signal pairs associated with the communication with the second WD; and at set intervals ($T_K$):

determine a set of mode peaks of the first set of RTTs;

determine that the first SIFS mode has the highest mode peak of the set of mode peaks and selecting the first SIFS mode as a reference mode;

determine that the second SIFS mode has the second highest peak of the set of mode peaks;

determine a mode difference (TD) between highest mode peak of the first SIFS mode and the second highest peak of the second SIFS mode; and adjust the second subset of RTTs that correspond to the second SIFS mode at least by adding or subtracting TD to each RTT of the second subset of RTTs;

determine a second set of RTTs comprising the first subset of RTTs and the adjusted second subset of RTTs, the second set of RTTs corresponding to the adjusted single SIFS mode; and determine a location of the second WD based on the second set of RTTs.

* * * * *